US010343772B2

(12) United States Patent
Bosworth et al.

(10) Patent No.: US 10,343,772 B2
(45) Date of Patent: Jul. 9, 2019

(54) PITCH HORN ASSEMBLY

(71) Applicant: Bell Helicopter Textron Inc., Fort Worth, TX (US)

(72) Inventors: Jeffrey M. Bosworth, Flower Mound, TX (US); Kyle T. Cravener, Watauga, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 240 days.

(21) Appl. No.: 15/645,110

(22) Filed: Jul. 10, 2017

(65) Prior Publication Data
US 2019/0009898 A1   Jan. 10, 2019

(51) Int. Cl.
*B64C 27/605* (2006.01)
*B64C 27/72* (2006.01)

(52) U.S. Cl.
CPC ............ *B64C 27/605* (2013.01); *B64C 27/72* (2013.01); *B64C 2027/7294* (2013.01)

(58) Field of Classification Search
CPC ....... B64C 27/605; B64C 27/72; B64C 27/48; B64C 27/54; B64C 27/78; B64C 29/0033; B64C 11/06; B64C 11/30; B64C 2027/7294
See application file for complete search history.

(56) References Cited

U.S. PATENT DOCUMENTS

| 5,562,416 | A  * | 10/1996 | Schmaling | B64C 27/48 |
|||||416/134 A|
| 7,216,429 | B2 * | 5/2007 | Logan | B64C 27/473 |
|||||244/17.23|
| 8,257,051 | B2 * | 9/2012 | Stamps | B64C 27/32 |
|||||416/134 A|
| 8,936,436 | B2 * | 1/2015 | Stamps | B64C 27/605 |
|||||416/114|
| 9,156,544 | B2 * | 10/2015 | Wiinikka | B64C 27/605 |
| 9,156,545 | B1 | 10/2015 | Fenny et al. | |

(Continued)

FOREIGN PATENT DOCUMENTS

WO   WO-2016028762 A1 * 2/2016 ............. B64C 27/78

OTHER PUBLICATIONS

Amendment filed May 2, 2016, with the USPTO, regarding U.S. Appl. No. 13/841,390.

*Primary Examiner* — Grant Moubry
*Assistant Examiner* — James G Moubry
(74) *Attorney, Agent, or Firm* — Timmer Law Group, PLLC

(57) ABSTRACT

A pitch horn assembly for an aircraft including a blade attachment member having a first end, a second end configured to be coupled to a rotor blade; and a blade attachment axis extending between the first end and the second end of the blade attachment member; a moveable arm configured to be coupled to the blade attachment member at a pitch horn axis, the moveable arm having a first end configured to be coupled to a pitch link; a second end; and a moveable arm axis extending between the first end and the second end of the moveable arm; an extendable member configured to be coupled to the blade attachment member and the moveable arm of the pitch horn, wherein the extendable member moves the moveable arm about the pitch horn axis. An embodiment provides a method of adjusting a pitch-flap coupling in an aircraft.

21 Claims, 22 Drawing Sheets

(56) References Cited

U.S. PATENT DOCUMENTS

| | | | | |
|---|---|---|---|---|
| 9,457,889 B2* | 10/2016 | Filter | ...................... | B64C 27/46 |
| 9,637,228 B2* | 5/2017 | Mazet | ...................... | B64C 27/54 |
| 9,657,582 B2* | 5/2017 | Haldeman | .................. | F01D 7/00 |
| 2014/0271180 A1* | 9/2014 | Haldeman | .................. | F01D 7/00 |
| | | | | 416/1 |
| 2014/0271203 A1 | 9/2014 | Foskey et al. | | |
| 2017/0217583 A1* | 8/2017 | Halcom | .................. | B64C 27/78 |
| 2017/0320567 A1* | 11/2017 | Miller | .................... | B64C 27/33 |

* cited by examiner

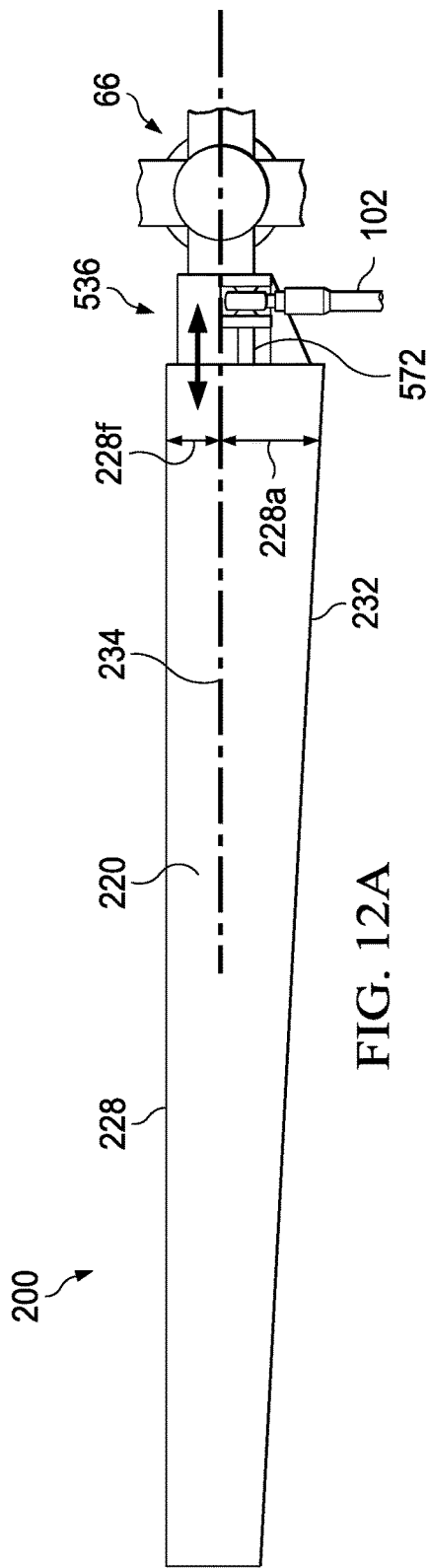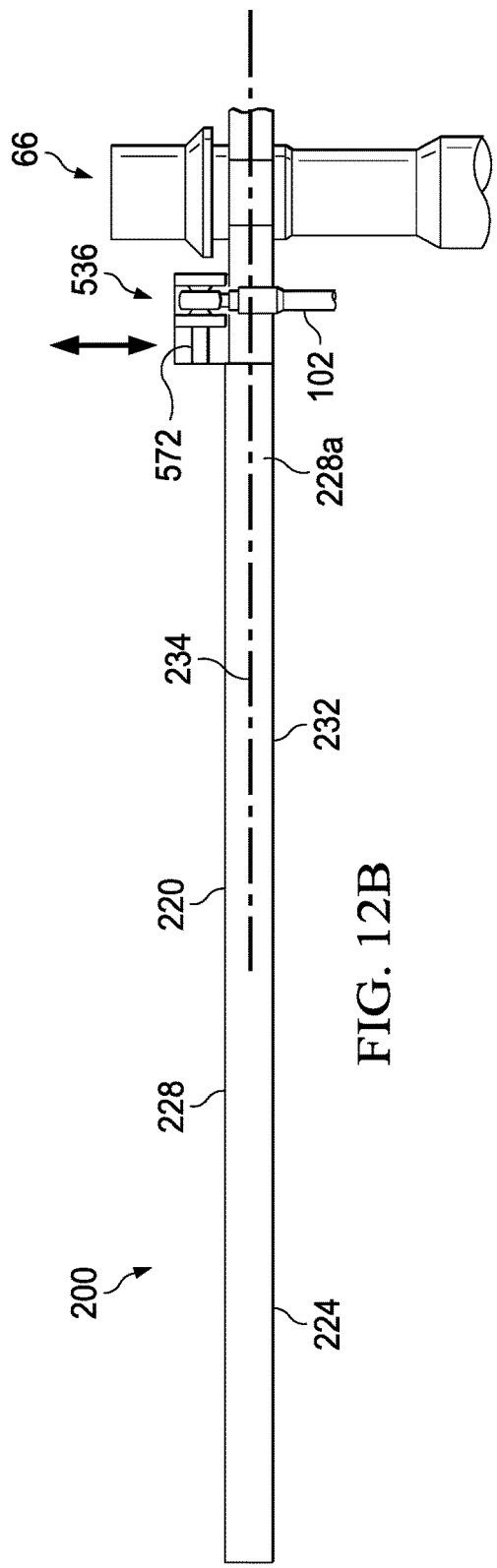

PITCH HORN ASSEMBLY

BACKGROUND

Technical Field

The present disclosure relates to pitch horn assemblies and, more particularly, to pitch horn assemblies that can be adjusted.

Description of Related Art

An aircraft can encounter various forces on the aircraft during rotation of one or more aircraft rotor assemblies, such as during flight. Aircraft design can attempt to accommodate such forces with pitch-flap coupling techniques. Conventional rotor assembles include a pitch horn that is not adjustable during rotation of the rotor assembly and designed for a particular aircraft. Therefore, conventional rotor assemblies cannot attempt to improve pitch-flap coupling during rotation of the rotor assembly by adjusting the pitch horn and/or the positioning of a pitch link. Instead, conventional rotor assemblies often seek to increase rotor blade stiffness, which increases rotor blade weight, and often further seek to introduce other pre-rotation components, such as offset pitch horns and/or delta-3 hinges. Furthermore, a conventional pitch horn is specially tailored to the rotor assembly and to the aircraft to which it is coupled and cannot be shared among rotor assemblies and among aircrafts.

There is a need for a pitch horn assembly that can improve pitch-flap coupling of an aircraft, such as during rotation of one or more rotor assemblies, decrease weight of the rotor assembly, such as by decreasing wing material, increase stability of the aircraft, increase adjustability of the rotor assembly, and improve versatility of the aircraft, such as by addressing forces on a rotor assembly during rotation, while remaining easily adaptable to be used with a variety of rotor assemblies and a variety of aircrafts.

SUMMARY

In a first aspect, there is an aircraft pitch horn assembly including a blade attachment member having a first end, a second end configured to be coupled to a rotor blade; and a blade attachment axis extending between the first end and the second end of the blade attachment member; a moveable arm configured to be coupled to the blade attachment member at a pitch horn axis, the moveable arm having a first end configured to be coupled to a pitch link; a second end; and a moveable arm axis extending between the first end and the second end of the moveable arm; and an extendable member configured to be coupled to the blade attachment member and the moveable arm of the pitch horn, wherein the extendable member moves the moveable arm about the pitch horn axis.

In an embodiment, the extendable member is coupled to the first end of the blade attachment member, and the extendable member is coupled to the second end of the moveable arm.

In another embodiment, the second end of the moveable arm is configured to be coupled to the second end of the blade attachment member.

In yet another embodiment, the rotor blade includes a first end, a second end, and a blade axis extending between the first end and the second end of the rotor blade, the blade attachment axis is substantially parallel to the blade axis, and the pitch horn axis is substantially perpendicular to the blade axis.

In still another embodiment, the extendable member moves the first end of the moveable arm about the pitch horn axis such that the moveable arm axis defines an angle of at least 15 degrees with respect to the blade axis.

In one embodiment, the extendable member moves the first end of the moveable arm about the pitch horn axis such that the moveable arm axis defines an angle from 0 to 120 degrees with respect to the blade axis.

In another embodiment, the extendable member moves the first end of the moveable arm about the pitch horn axis such that the first end of the moveable arm is positioned at least 15 inches from the blade axis.

Another aspect provides an aircraft rotor assembly including a hub; a plurality of rotor blades extending from and configured to rotate about the hub, each of the plurality of rotor blades having a first end, a second end, and a blade axis extending between the first end and the second end; a pitch horn assembly coupled to at least one rotor blade of the plurality of rotor blades, including: a blade attachment member having a first end; and a second end coupled to the at least one rotor blade; a blade attachment member axis extending between the first end and the second end of the blade attachment member; a moveable arm coupled to the rotor assembly at a pitch horn axis, the moveable arm having a first end coupled to a pitch link; a second end; and a moveable arm axis extending between the first end and the second end of the moveable arm; and an extendable member coupled to the blade attachment member and the moveable arm of the pitch horn, wherein the extendable member moves the moveable arm about the pitch horn axis.

In an embodiment, the pitch horn assembly permits adjustment of a pitch horn radius.

In another embodiment, the blade attachment member is fixedly coupled to the at least one rotor blade.

In yet another embodiment, the second end of the moveable arm is coupled to the second end of the blade attachment member.

In still another embodiment, the extendable member is operable to change the rotor blade and pitch horn assembly configuration.

In one embodiment, the pitch horn assembly is operable to move a portion of the pitch link closer to the at least one rotor blade.

In another embodiment, the pitch horn assembly can be configured to adjust a leading edge of the at least one rotor blade or a trailing edge of the at least one rotor blade.

In still another embodiment, the blade attachment member axis is substantially parallel to the blade axis, and the pitch horn axis is substantially perpendicular to the blade axis.

In a further embodiment, the extendable member moves the first end of the moveable arm about the pitch horn axis such that the moveable arm axis defines an angle of at least 15 degrees with respect to the blade axis.

In an embodiment, the pitch horn assembly is disposed on at least one of the following: a leading edge, a trailing edge, a top surface, and a bottom surface of the at least one rotor blade.

Still another aspect provides a method of adjusting a pitch-flap coupling in an aircraft including providing a pitch horn assembly coupled to at least one rotor blade of a plurality of rotor blades, each having a blade axis, the pitch horn assembly having: a blade attachment member; a moveable arm, where at least a portion of the moveable arm is configured to move about a pitch horn axis and movably coupled to a pitch link; and an extendable member coupled to the blade attachment member and the moveable arm of the pitch horn; and moving the moveable arm about the pitch horn axis such that the pitch link is adjusted.

In an embodiment, the at least a portion of the moveable arm moves at least 15 degrees about the pitch horn axis.

In another embodiment, the method includes detecting forces on the at least one rotor blade in a first position; moving at least a portion of the moveable arm about the pitch horn axis to a second position in response to the forces; and detecting the forces on the at least one rotor blade in the second position.

In yet another embodiment, the step of moving further includes moving the at least a portion of the moveable arm about the pitch horn axis such that the moveable arm defines an angle from 0 to 120 degrees with respect to the blade axis.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIG. 12A is a top view of a rotor assembly, according to one example embodiment; and FIG. 12B is a side view of a rotor assembly, according to one example embodiment.

DESCRIPTION OF THE PREFERRED EMBODIMENT

Illustrative embodiments of the tools and methods are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, assemblies, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, assemblies, etc. described herein may be oriented in any desired direction.

Figure 1:
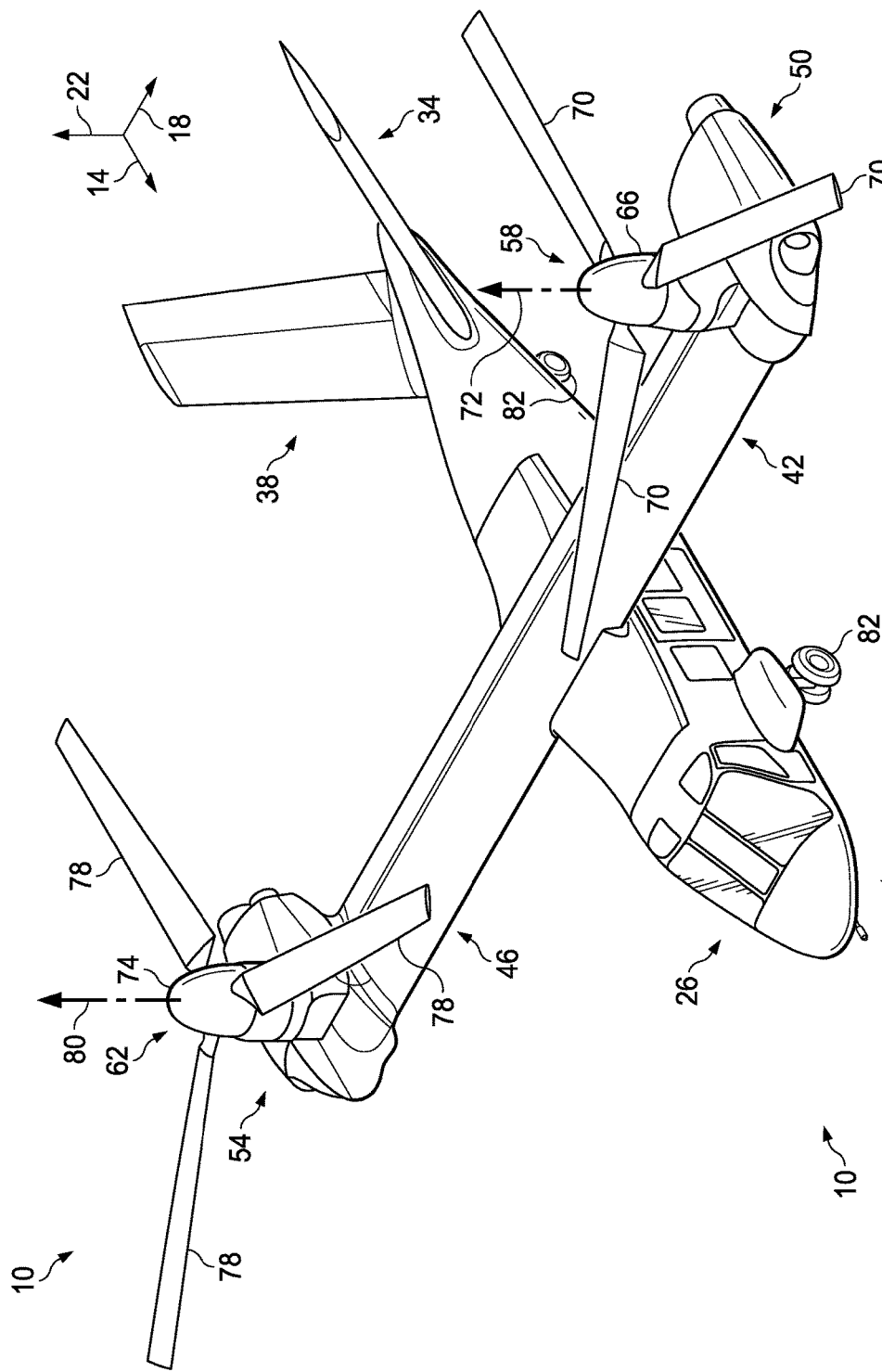
FIG. 1 is a perspective view of an aircraft, according to one example embodiment.
Figure 2:
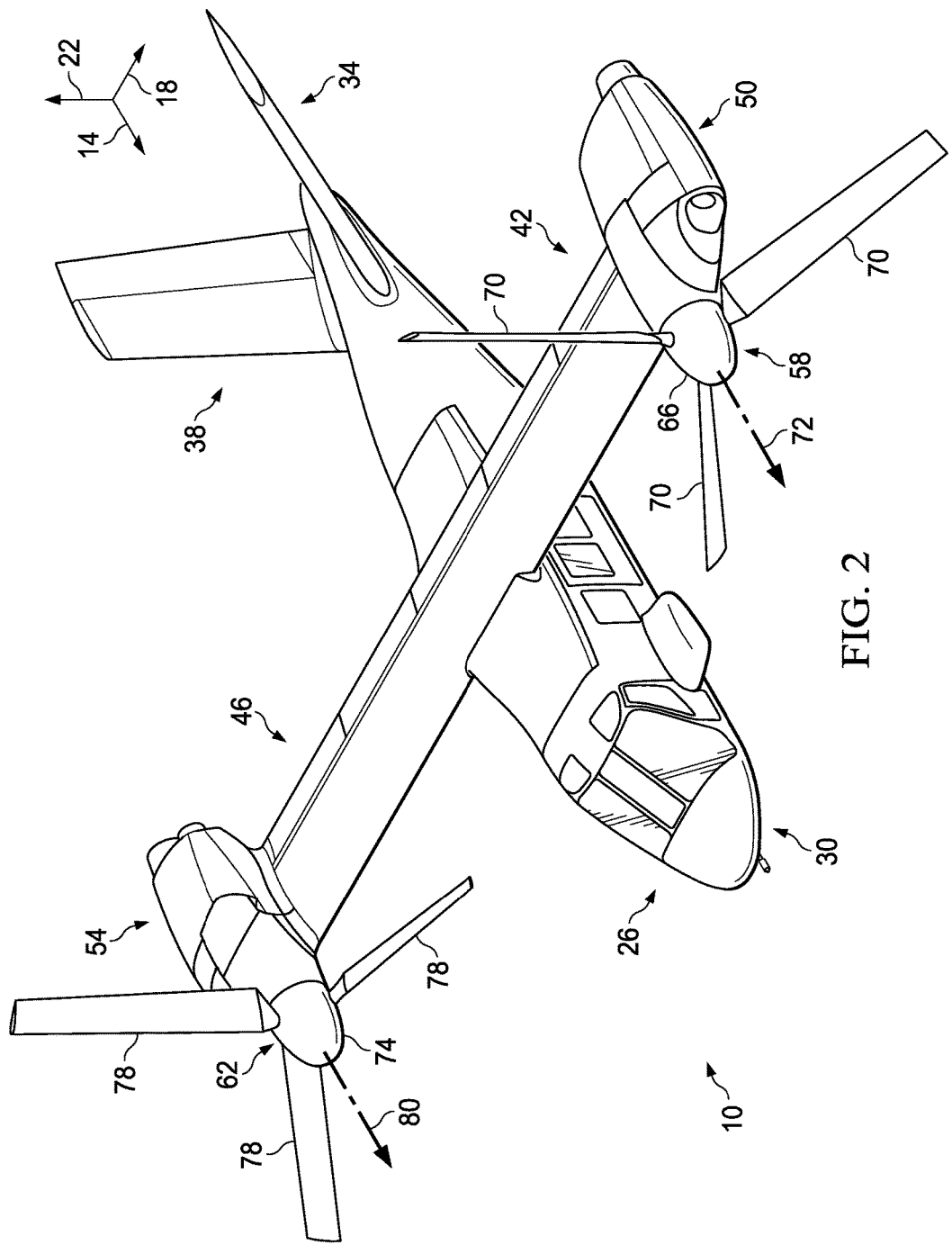
FIG. 2 is another perspective view of an aircraft, according to one example embodiment.

FIGS. 1-2 depict aircraft 10 and three mutually orthogonal directions X, Y, and Z forming a three-dimensional frame of reference XYZ. Longitudinal axis X 14 corresponds to the roll axis that extends through the center of aircraft 10 in the fore and aft directions. Transverse axis Y 18 is perpendicular to longitudinal axis 14 and corresponds to the pitch axis (also known as a control pitch axis or "CPA"). The X-Y plane is considered to be "horizontal." Vertical axis Z 22 is the yaw axis and is oriented perpendicularly with respect to the X-Y plane. The X-Z plane and Y-Z plane are considered to be "vertical."

Aircraft 10 includes fuselage 26 as a central main body. Fuselage 26 extends parallel to longitudinal axis 14 from a fuselage front end 30 to a fuselage rear end 34. Aircraft 10 further includes tail member 38 extending from fuselage rear end 34 of fuselage 26. Aircraft 10 includes wing 42 and wing 46 extending from fuselage 26 substantially parallel to transverse axis Y 18. Wing 42 is coupled to propulsion system 50, and wing 46 is coupled to propulsion system 54. Propulsion system 50 includes rotor assembly 58, and propulsion system 54 includes rotor assembly 62. Rotor assembly 58 includes rotor hub 66 and plurality of rotor blades 70 extending from rotor hub 66, and plurality of rotor blades 70 are configured to rotate about axis 72. Similarly, rotor assembly 62 includes rotor hub 74 and plurality of rotor blades 78 extending from rotor hub 74, and plurality of rotor blades 78 are configured to rotate about axis 80. Aircraft 10 can, for example, be coupled to and controlled with a power system connected to a drive system, such as one continuous drive system or a segmented drive system separated by a gearbox, including electric propulsion systems, hydraulic drive systems, or a conventional drive system.

Rotor assemblies 58 and 62 are controllable and positionable to, for example, enable control of direction, thrust, and lift of aircraft 10. For example, FIG. 1 illustrates aircraft 10 in a first configuration, in which propulsion systems 50 and 54 are positioned to provide a lifting thrust to aircraft 10, if activated. In the embodiment shown in FIG. 1, propulsion systems 50 and 54 are positioned such that, if activated, aircraft 10 moves substantially in the Z direction ("helicopter mode"). In the embodiment shown in FIG. 1, aircraft 10 further includes landing gear 82 with which aircraft 10 can contact a landing surface.

FIG. 2 illustrates aircraft 10 in a second configuration, in which propulsion systems 50 and 54 are positioned to provide a forward thrust to aircraft 10, if activated. In the embodiment shown in FIG. 2, propulsion systems 50 and 54 are positioned such that, if activated, aircraft 10 moves substantially in the X direction ("airplane mode"). In the second configuration depicted in FIG. 2, wings 42 and 46 enable a lifting thrust to be provided to aircraft 10. Wings 42 and 46 can be configured to increase the wing span and wing aspect ratio, which thereby increases lift/draft ratio, aircraft efficiency, and fuel economy. Though not depicted in FIGS. 1-2, propulsion systems 50 and 54 can be controllably positioned in helicopter mode, airplane mode, or any position between helicopter mode and airplane mode to provide for a desired direction, thrust, and/or lift.

Each of rotor assemblies 58 and 62 can include a swashplate control system, such as swashplate control system 86 depicted in FIGS. 3A-4B. Though swashplate control system 86 of rotor assembly 58 is exemplified in FIGS. 3A-4B, rotor assembly 62 can include a swashplate control system with the same or similar features as swashplate control system 86. Swashplate control system 86 enables collective control and cyclic control of rotor assembly 58. Swashplate control system 86 includes nonrotating member 90 and rotating member 94 and can have bearings or other features therebetween to facilitate movement of rotating member 94 with respect to nonrotating member 90 (e.g., rotation of rotating member 94 with respect to nonrotating member 90). In the embodiment shown, mast 96 extends through nonrotating member 90 and rotating member 94.

Figure 3A:
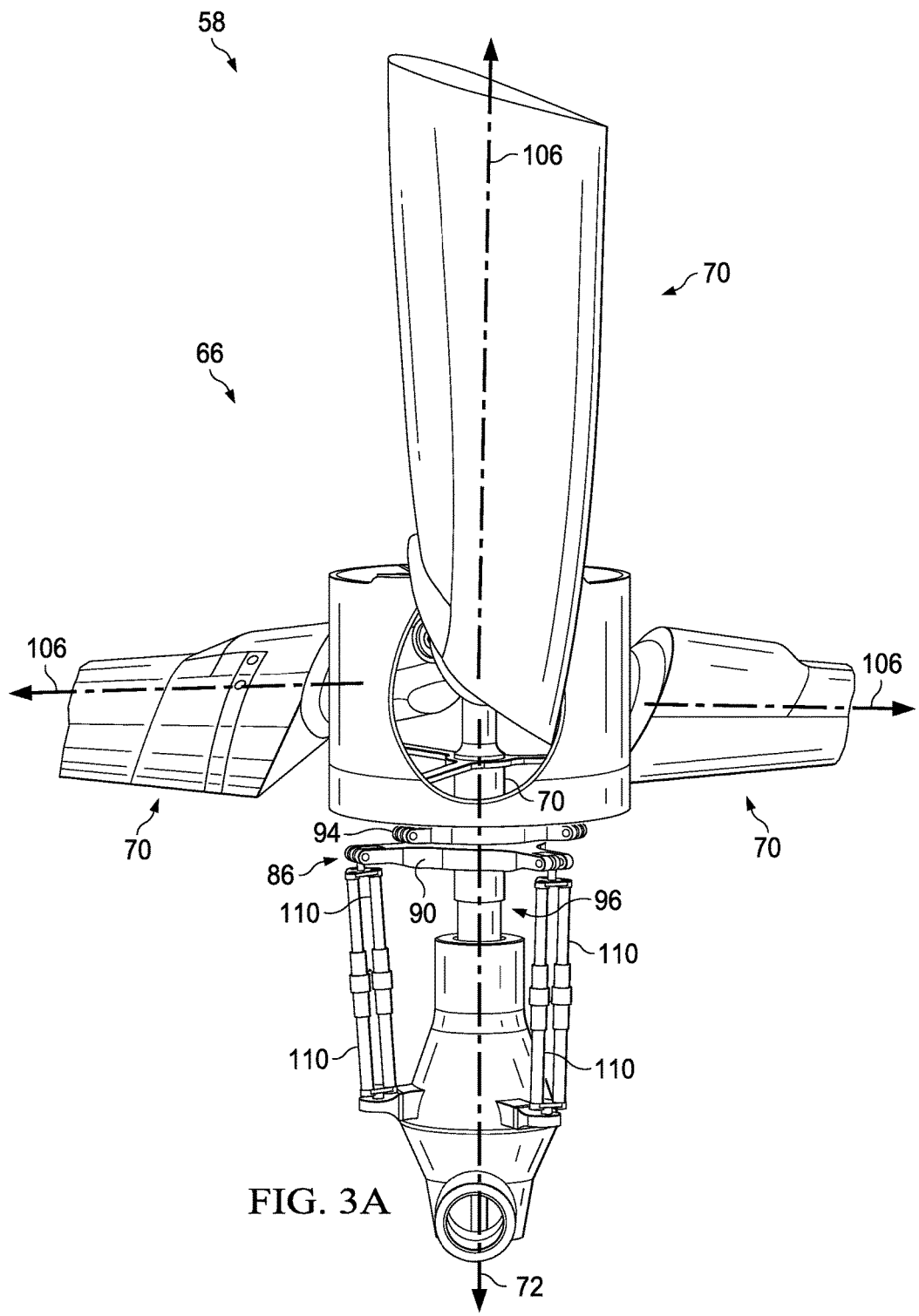
FIG. 3A is a side view of a rotor assembly, according to one example embodiment.
Figure 3B:
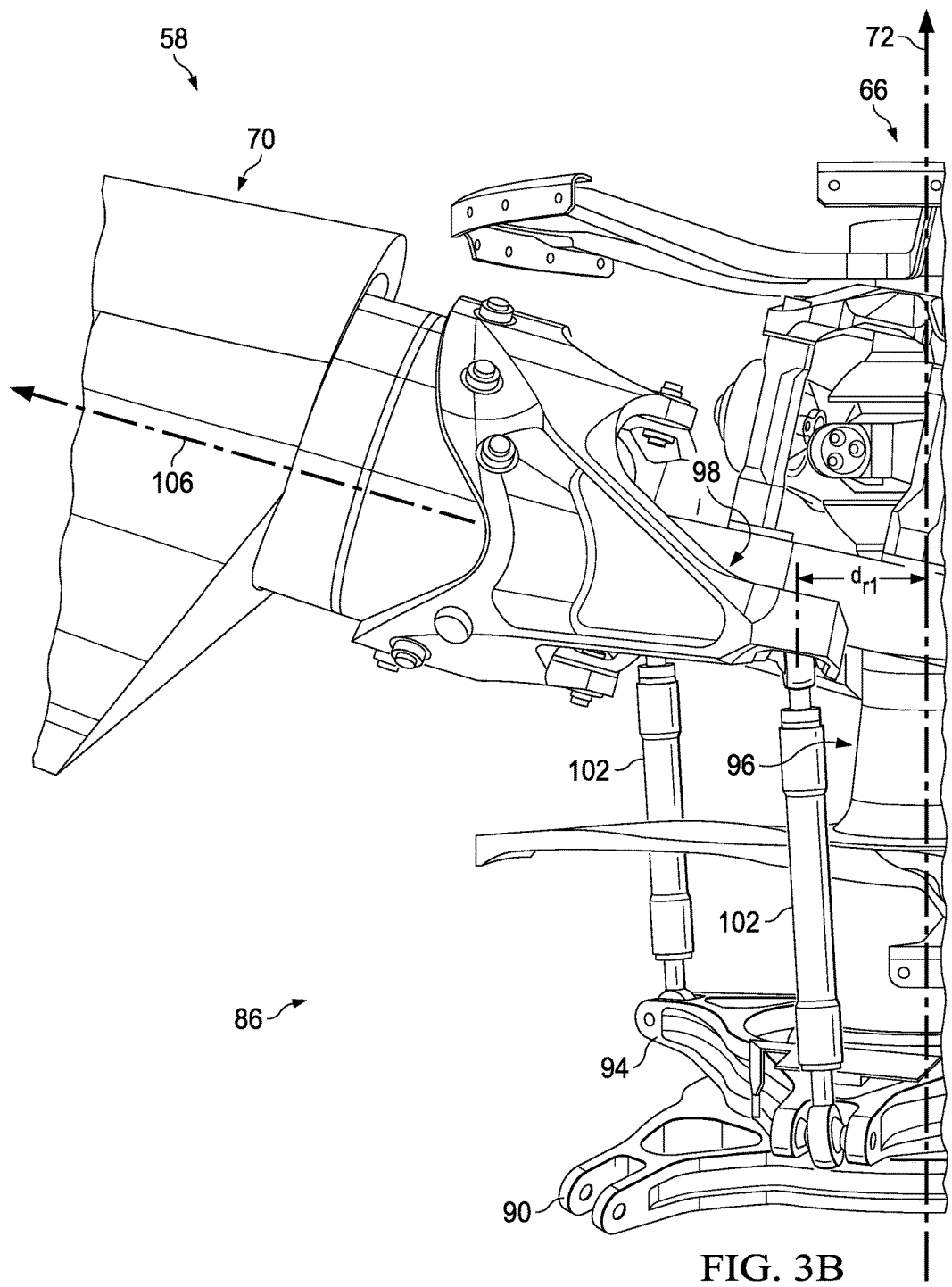
FIG. 3B is another side view of the rotor assembly of FIG. 3A, according to one example embodiment.
Figure 4A:
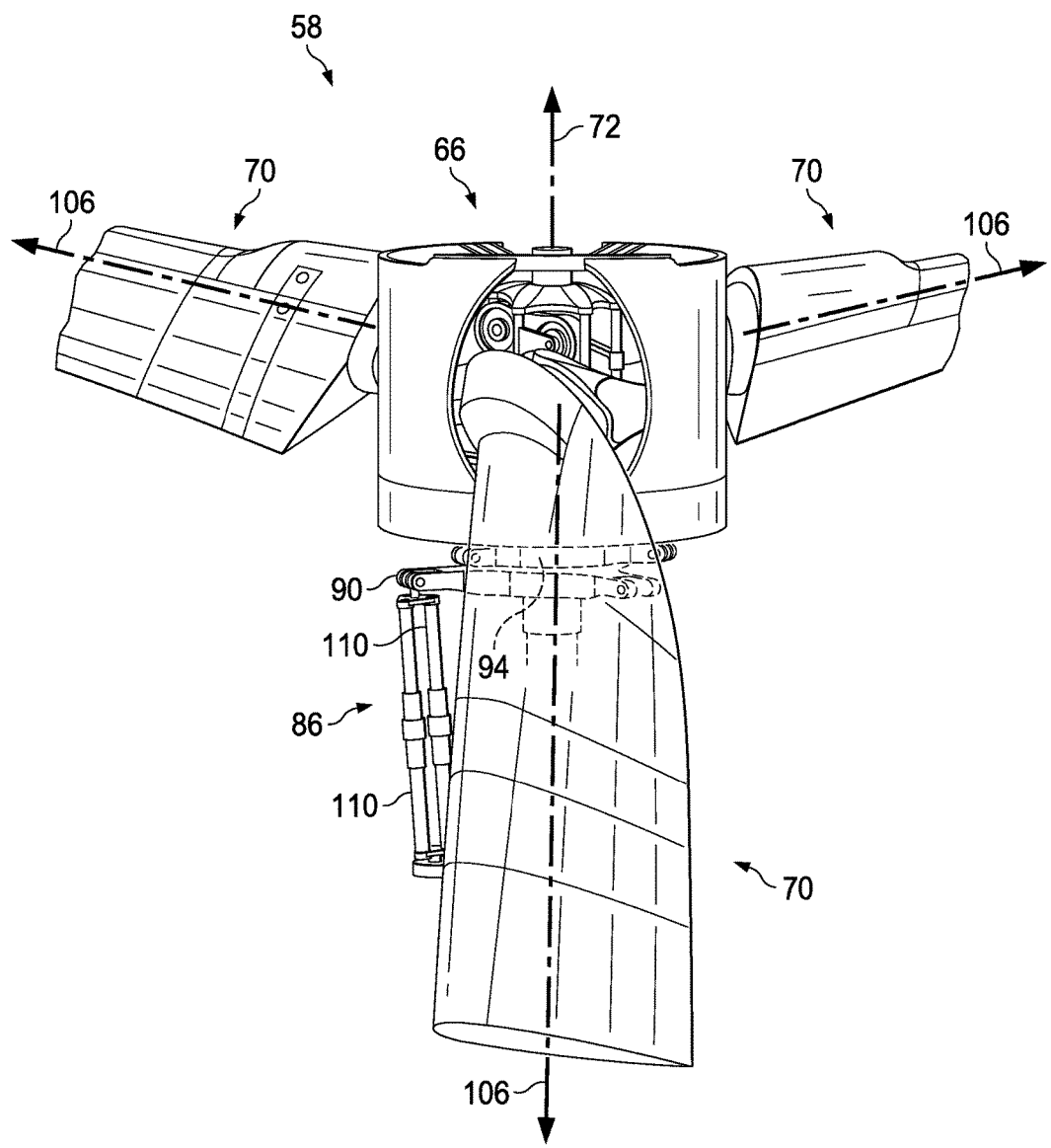
FIG. 4A is a side view of a rotor assembly, according to one example embodiment.
Figure 4B:
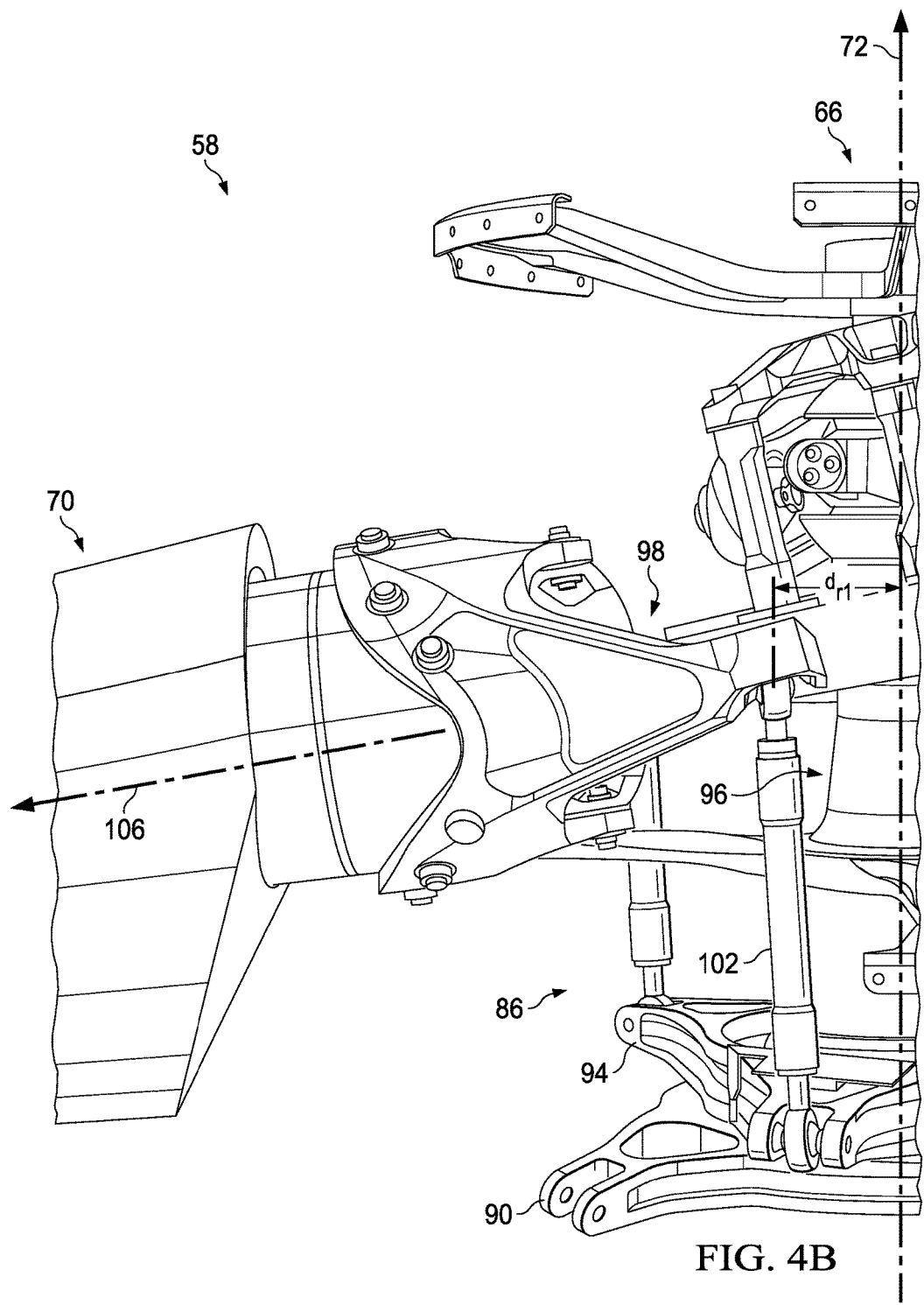
FIG. 4B is another side view of the rotor assembly of FIG. 4A, according to one example embodiment.

Each of plurality rotor blades 70 can be coupled to rotating member 94 via pitch horn 98 and pitch link 102. In the embodiment shown in FIGS. 3B and 4B, one blade of plurality of blades 70 is depicted coupled to pitch horn 98. Pitch horn 98 is also coupled to pitch link 102, and pitch link 102 is coupled to rotating member 94. In the embodiment shown, pitch horn 98 is fixedly coupled to each of plurality of rotor blades 70 and is further fixedly coupled to pitch link 102 such that the relative position of any portion of pitch horn 98 and any portion of rotor blade 70 to which pitch horn 98 is coupled cannot be adjusted. Further, the relative position of any portion of pitch horn 98 to any other portion of pitch horn 98 cannot be adjusted. In other words, each portion of pitch horn 98 remains a constant distance to a given position on each rotor blade 70 to which pitch horn 98 is coupled, and each portion of pitch horn 98 remains a constant distance to each other portion of pitch horn 98. Similarly, each portion of pitch horn 98 remains a constant distance from a blade axis 106 that extends through each of plurality of rotor blades 70. Furthermore, a pitch horn radius, which is the distance between an axis about which the rotor blades rotate (e.g., axis 72 about which rotor blades 70 rotate) and a portion of the pitch horn coupled to a pitch link (e.g., portion of pitch horn 98 coupled to pitch link 102) remains substantially constant during movement rotor blades 70 via pitch horn 98 and pitch link 102. For example, as depicted in FIGS. 3B and 4B, pitch horn radius has a substantially constant dimension do when rotor blade 70 is flapped upward in FIG. 3B, when rotor blade 70 is flapped downward in FIG. 4B, and in other instances in which rotor blade 70 is moved via pitch horn 98 and pitch link 102.

Swashplate control system 86 further includes swashplate actuators 110, which are each coupled to and each configured to independently move nonrotating member 90 (e.g., in a direction toward and away from rotating member 94). Movement of nonrotating member 90 results in a corresponding movement of rotating member 94. Pilot inputs are coupled to swashplate control system 86 to enable a pilot to alter the vertical position of nonrotating member 90 (e.g., via swashplate actuators 110) through the collective control and alter the tilt of nonrotating member 90 through the cyclic control. If a pilot input alters nonrotating member 90, a corresponding portion of rotating member 94 is altered, which causes rotating member 94 to alter the blade angle of each rotor blade 70 via pitch link 102 and pitch horn 94 (e.g., which, in turn, alters the total lift).

For example, if swashplate control system 86 moves vertically upward (or raises), the blade angle (or "pitch") of each rotor blade 70 is increased substantially simultaneously and by the same amount, which increases lift, such that the blade angle of each rotor blade 70 remains substantially the same. As another example, if swashplate control system 86 moves vertically downward, the blade angle of each rotor blade 70 is decreased substantially simultaneously and by the same amount, which decreases lift, such that the blade angle of each rotor blade 70 remains substantially the same.

As a further example, if the cyclic control is altered, nonrotating member 90 tilts, which causes each of rotor blades 70 to alter its blade angle continuously (e.g., upward and downward) during one full rotation about mast 96 ("flap""). In other words, the blade angle of each rotor blade 70 varies as a function of the angular position of each rotor blade 70 as it rotates about mast 96. Swashplate control system 86, and specifically cyclic controls, can drive cyclic blade angles with a sinusoidal function such that the motion of each of rotor blades 70 is the same as the motion of each other rotor blade 70 through one full rotation.

During rotation of one or more rotor assemblies, such as during flight, an aircraft and the one or more rotor assemblies can experience various destabilizing forces. For example, pitch-flap coupling relates to adjusting of one or more rotor blades, including each respective rotor blade angle, to accommodate and/or counteract various destabilizing forces that can occur on an aircraft during rotation of one or more rotor assemblies. For example, positive and negative pitch-flap coupling attempt to accommodate, account for, and/or oppose various destabilizing forces that can occur on an aircraft during rotation of one or more rotor assemblies. Positive pitch-flap coupling includes decreasing a rotor blade angle for an advancing rotor blade, which reduces lift and produces a change in flap that accounts for and opposes the upward flap motion produced by an advancing blade. Similarly, positive pitch-flap coupling includes increasing a rotor blade angle for a retreating rotor blade, which increases lift and produces a change in flap that accounts for and opposes the downward flap motion produced by a retreating blade. Negative pitch-flap coupling (e.g., increasing rotor blade angle for an advancing rotor blade and decreasing a rotor blade angle for a retreating rotor blade) can also account for various destabilizing forces that can occur on an aircraft during rotation of one or more rotor assemblies. Positive and negative pitch-flap coupling for a fixed pitch horn and pitch link combination, such as that depicted in FIGS. 3A-4B, can be accomplished, for example, by offsetting the pitch horn and/or using a delta-3 hinge. Both of these pitch-flap coupling techniques are not adjustable during flight and, therefore, adjusting pitch-flap coupling with such pitch horns during flight remains challenging.

This disclosure depicts and describes pitch horn assemblies, components and features thereof, and methods relating thereto. Any pitch horn assembly, component and feature thereof, or method relating thereto depicted in FIGS. 5-12B and/or described herein can be used with aircraft 10 depicted in FIGS. 1-2 and described herein and/or the swashplate control system 86 depicted in FIGS. 3A-4B and described herein.

Additionally, the pitch horn assemblies, components and features thereof, and methods relating thereto depicted in FIGS. 5-12B and/or described herein can be used with any aircraft having one or more rotor assemblies, including tiltrotor aircrafts, helicopters, tilt wing aircrafts, unmanned aerial vehicles (UAVs), and other vertical lift or VTOL aircrafts, or can further be used with any device having one or more rotor assemblies, including devices with propellers, windmills, and wind turbines. Further, any features of one embodiment of the pitch horn assemblies or components thereof in this disclosure can be used with any other embodiment of the pitch horn assemblies or components thereof in this disclosure such that the other embodiment has the same or similar features, operates in the same or similar way, or achieves the same or similar functions. Some components of this disclosure are depicted by graphic shapes and symbols. Unless this disclosure specifies otherwise, such components should be understood to include the same or similar characteristics and features as those components that are named or described, though the graphic shapes and symbols may not depict each such characteristic or feature.

Figure 5:
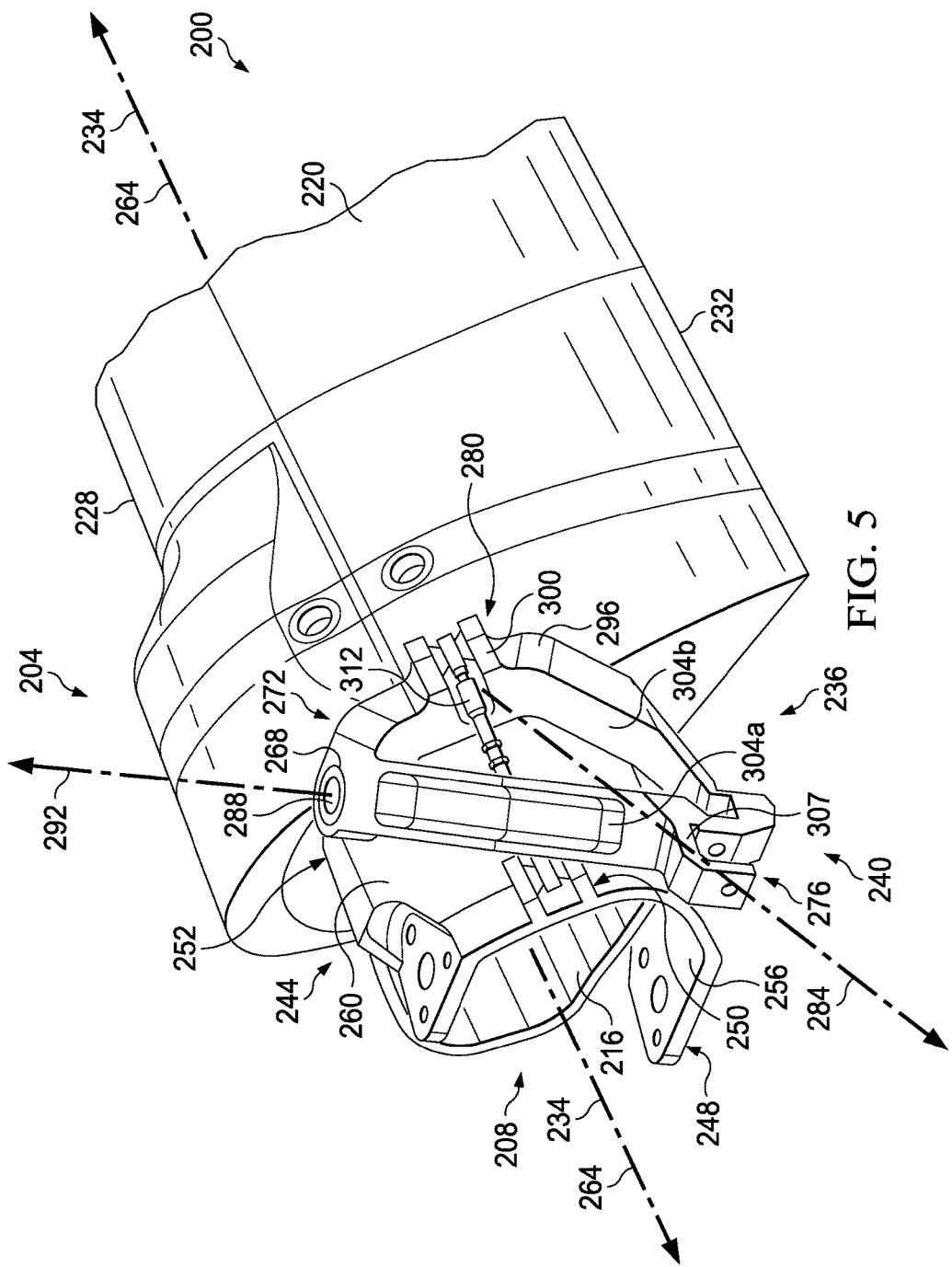
FIG. 5 is a front perspective view of a pitch horn assembly, according to one example embodiment.
Figure 6:
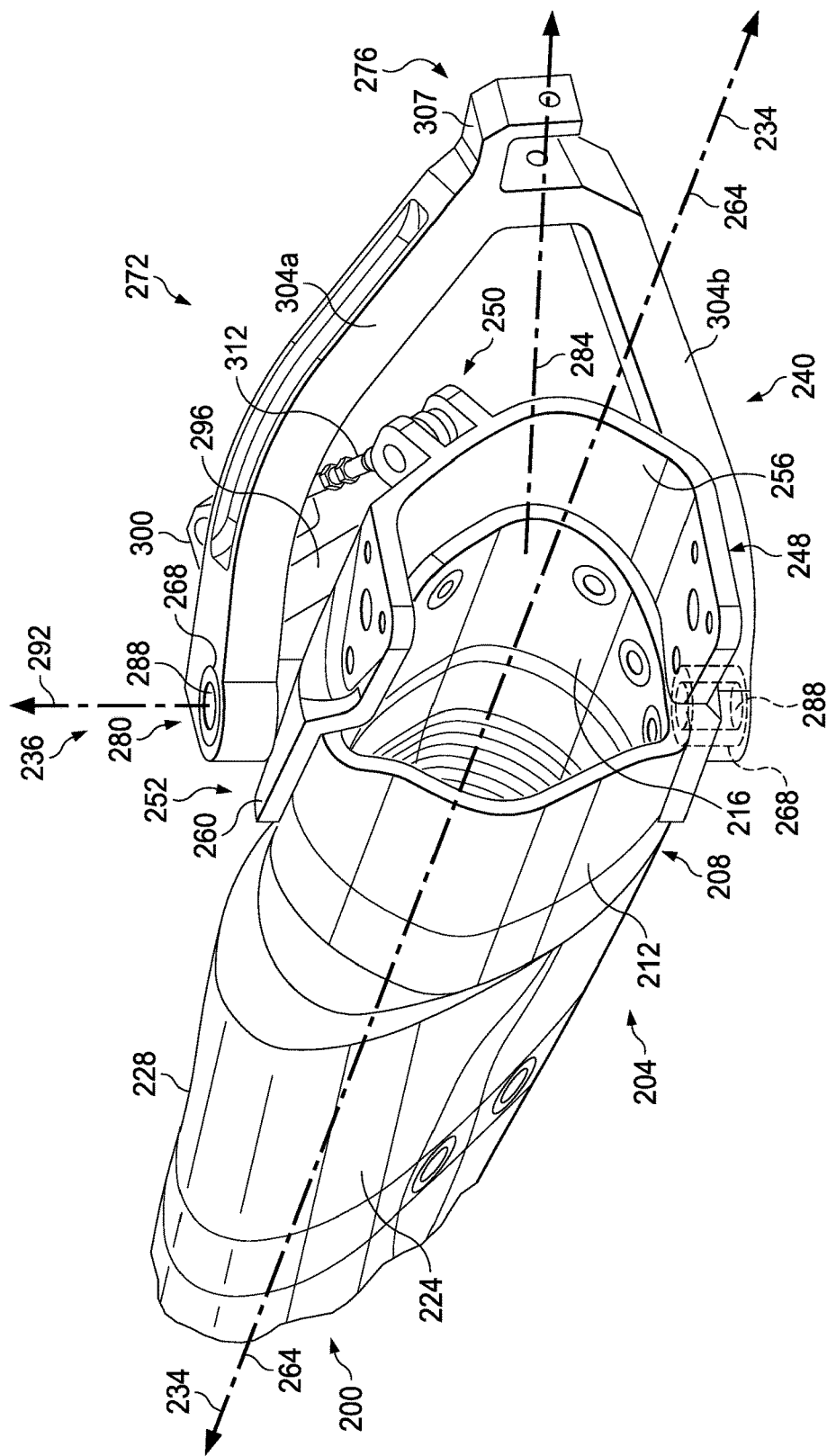
FIG. 6 is rear perspective view of a pitch horn assembly, according to one example embodiment.
Figure 7:
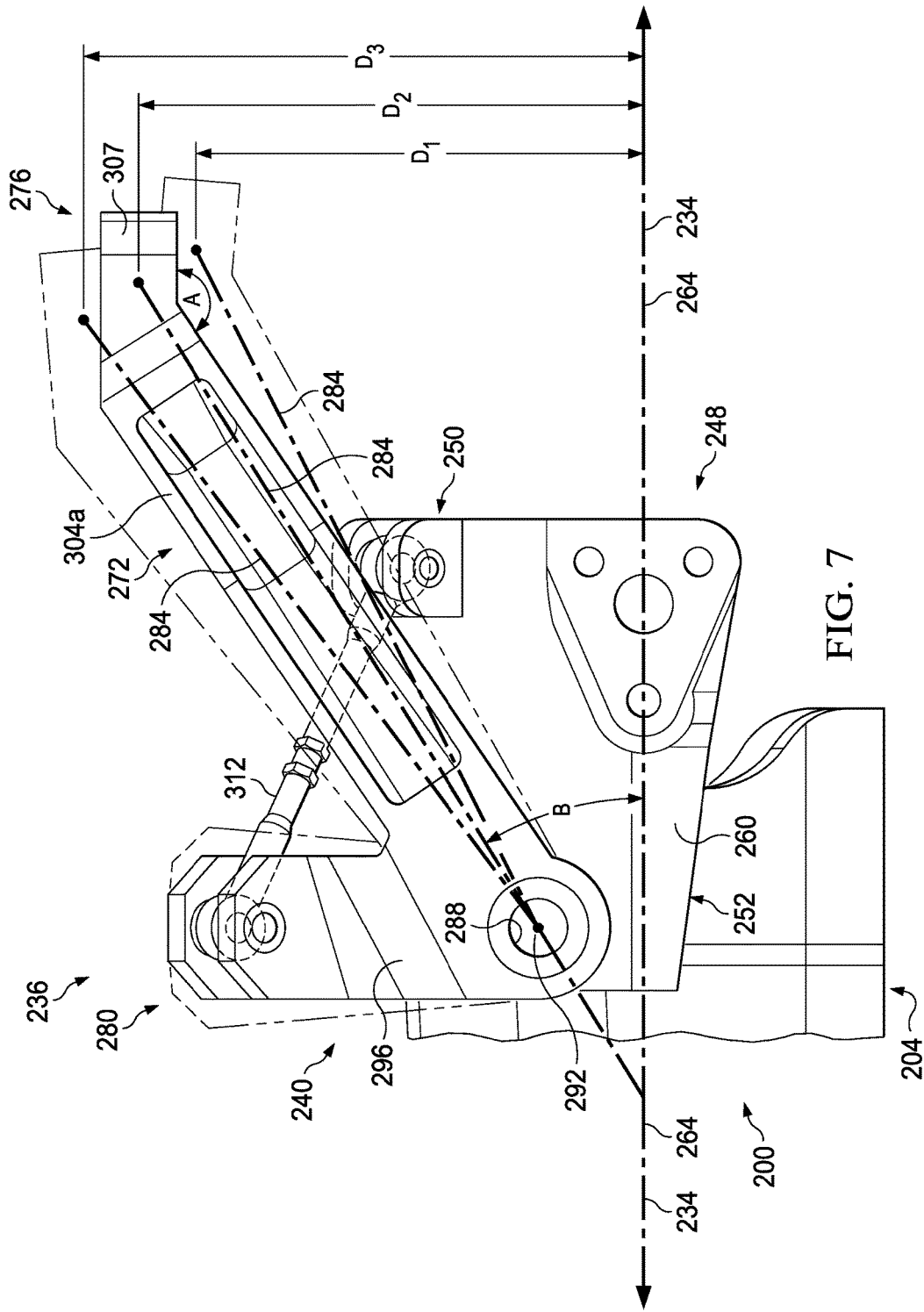
FIG. 7 is a top view of a pitch horn assembly, according to one example embodiment.

FIGS. 5-7 depict a portion of rotor blade 200. FIGS. 5-7 depict first end 204 of rotor blade 200 having grip 208, which is configured to be coupled to a hub of a rotor assembly to enable rotor blade 200 to extend from and rotate about the hub. In the embodiment shown in FIGS. 5-7, grip 208 has exterior surface 212 and interior surface 216. Rotor blade 200 further includes top surface 220, bottom surface 224, leading edge 228, and trailing edge 232, where top surface 220 and bottom surface 224 extend between leading edge 228 and trailing edge 232. Top surface 220, bottom surface 224, leading edge 228, and trailing edge 232 extend from first end 204 of rotor blade 200 toward a second end (not depicted) of blade 200, and blade axis 234 extends from first end 204 to the second end of rotor blade 200. Grip 208 extends about blade axis 234.

FIGS. 5-8 depict pitch horn assembly 236. Pitch horn assembly 236 can include a blade attachment member 244. Blade attachment member 244 has first end 248, which is configured to be coupled to a portion of a rotor hub. First end 248 of blade attachment member 244 also includes coupling member 250 at which an extendable member can be coupled to enable portions of pitch horn assembly 236 to move, which is discussed in detail below. Blade attachment member 244 also has second end 252, which is configured to be coupled to a rotor blade (and is depicted coupled to rotor blade 200 in the embodiment shown in FIGS. 5-7) generally in the leading edge 228a portion of the rotor blade 200. Blade attachment member 244 is depicted fixedly coupled to rotor blade 200 such that blade attachment member 244 is prevented from movement during flight operations. First end 248 and second end 252 of blade attachment member 244 are configured to be coupled to a rotor blade and a portion of a rotor hub, respectively, for example, by screws, bolts, adhesives, hinges, and/or combinations thereof. Blade attachment member 244 includes interior surface 256, which, in the embodiment shown in FIGS. 5-7, is coupled to the exterior surface 212 on the trailing edge 232 of grip 208, and blade attachment member 244 further includes exterior surface 260. FIGS. 5-8 also depict blade attachment axis 264 extending from first end 248 to second end 252 of blade attachment member 244. Blade attachment member 244 extends about blade attachment axis 264 and has a curvilinear shape to enable blade attachment member 244 to extend at least partially about exterior surface 212 of grip 208 and, therefore, at least partially around blade axis 234. In other embodiments, blade attachment member 244 can have a variety of shapes to enable blade attachment member 244 to be coupled to another portion of rotor blade 200. In other embodiments, blade attachment member 244 is disposed generally adjacent to a trailing edge 232 portion, a top, or a bottom surface 220, 224, respectively, of the blade 200. In the embodiment shown in FIGS. 5-7, blade attachment axis 264 and blade axis 234 are both parallel and coaxial. However, in other embodiments, blade attachment axis 264 and blade axis 234 may be non-parallel and/or non-coaxial depending, for example, on the shape of blade attachment member 244, the shape of grip 208 (or the portion of rotor blade 200 to which blade attachment member 244 is configured to be coupled), the angle and/or position at which blade attachment member 244 and rotor blade 200 are configured to be coupled, and/or a desired orientation of pitch horn assembly 236, among other things. Blade attachment member 244 further includes at least one opening 268 (two openings 268 in the embodiment shown), which extends through second end 252 of blade attachment member 244 and which is configured to be coupled to another portion of pitch horn assembly 236, which is discussed in detail below.

Pitch horn assembly 236 further includes moveable arm 272 having first end 276, which is configured to be coupled to a pitch link of a rotor hub (e.g., such as pitch link 102 depicted in FIGS. 3B and 4B). Moveable arm 272 also has second end 280, which is configured to be coupled to blade attachment member 244 (and is depicted coupled to second end 252 of blade attachment member 244). In some embodiments, moveable arm 272 is configured to be coupled to another portion of blade attachment member, a rotor blade, such as rotor blade 200 (e.g., grip 208), and/or another portion of a rotor assembly. Moveable arm axis 284 extends between first end 276 and second end 280 of moveable arm 272. In the embodiment shown, second end 280 of moveable arm 272 further includes at least one opening 288 (two openings 288 in the embodiment shown), which extend through second end 280 of moveable arm 272 and which are configured to be positioned coaxially with openings 268 of blade attachment member 244 about pitch horn axis 292. Second end 252 of blade attachment member 244 and second end 280 of moveable arm 272 are configured to be coupled at openings 268 and openings 288, respectively, to enable moveable arm 272 to move or rotate about pitch horn axis 292. Moveable arm 272 and blade attachment member 244 can be coupled to each other in any way that enables relative motion therebetween, such as by a hinge, a pin, and the like. If pitch horn assembly 236 is coupled to a rotor blade, such as rotor blade 200 in FIGS. 5-7, pitch horn axis can be positioned substantially perpendicular to blade axis 234 and can be positioned substantially perpendicular to blade attachment axis 264. In other embodiments, pitch horn axis can be positioned non-perpendicular to blade axis 234 (e.g., 85 degrees, 80 degrees, 75 degrees, 70 degrees, 65 degrees, or less) and/or can be positioned non-perpendicular to blade attachment axis 264 (e.g., 85 degrees, 80 degrees, 75 degrees, 70 degrees, 65 degrees, or less) depending, for example, on the position at which pitch horn assembly 236 is coupled to a rotor blade, such as rotor blade 200.

In the embodiment shown, moveable arm 272 includes a base member 296, which has coupling member 300 that provides a pivot point for an extendable member 312 to move moveable arm 272. In a particular embodiment, coupling member 300 can represent any device that is capable of allowing the extendable member 312 to rotate relative to moveable arm 272 (e.g., a hinge member). Moveable arm 272 further includes first and second extension members 304a, 304b, which each extend from opposing ends of base member 296 and meet at pitch link coupling member 307. In the embodiment shown, first and second extension members 304a, 304b extend from the base 296 to the pitch link coupling member 307 in a generally triangular orientation. The pitch link coupling member 307 is rotatably connected to the respective pitch link. In an embodiment, the first and second extension members 304a, 304b are securely connected to the pitch link coupling member 307 at an angle A. Angle A can be, for example, 90 degrees, 95 degrees, 100 degrees, 105 degrees, 110 degrees, 115 degrees, 120 degrees, 125 degrees, 130 degrees, 135 degrees, or 140 degrees, depending, for example, on the size and type of pitch link to which pitch link coupling member 307 is to be coupled, the size and orientation of moveable arm 272, and the like. In the embodiment shown, pitch link coupling member 307 is unitary with first and second extension members 304a, 304b (e.g., made of the same material and/or at the same time); however, in other embodiments, pitch link coupling member 307 can be pivotably coupled to first and second extension members 304a, 304b (or to another portion of moveable arm 272) to enable adjustment of angle A. In other embodiments, moveable arm 272 can include other configurations to enable moveable arm 272 to provide a portion with which to couple moveable arm 272 to a pitch link and a portion with which to couple moveable arm 272 to an extendable member so that moveable arm 272 can move or rotate about pitch horn axis 292.

Moveable arm 272 and blade attachment member 244 are configured to be coupled such that moveable arm 272 and blade attachment member 244 (and, in the embodiment shown, moveable arm axis 284 and blade attachment axis 264, respectively) define an angle B. In other embodiments, moveable arm 272 can be configured to be coupled to a rotor blade (such as grip 208 of rotor blade 200), or to another component of a rotor blade assembly, to enable moveable arm 272 and blade attachment member 244 (and/or moveable arm axis 284 and blade attachment axis 264, respectively) to define an angle B. Angle B represents the angle at which moveable arm 272 (and, in the embodiment shown, moveable arm axis 284) can move or rotate about pitch horn axis 292 with respect to blade attachment member 244 (and, in the embodiment shown, blade attachment axis 272). Angle B can also represent the angle at which moveable arm 272 (and, in the embodiment shown, moveable arm axis 284) has moved or rotated about pitch horn axis 292 with respect to blade axis 234, where, as in the embodiment shown, blade axis 234 and blade attachment axis 272 are coaxial. In other embodiments, moveable arm 272 can be coupled to blade attachment member 244 in different configurations, in different positions, and/or at different locations to, for example, vary the location of pitch horn axis 292, to vary the length of moveable arm 272 (or the length that moveable arm 272 extends from blade attachment member 244), to vary the position of angle B or the extent to which moveable arm 272 can extend about pitch horn axis 292, to facilitate improved coupling of moveable arm 272 to blade attachment member 244, and/or to facilitate improved pitch-flap coupling configurations.

In the embodiment shown, pitch horn assembly 236 further includes extendable member 312, which can include an actuator, actuating nuts, an extendable or adjustable link, stacked components, a turnbuckle, thread rod ends, pull-in pins, and the like. Extendable member 312 is configured to be coupled to blade attachment member 244, such as to second end 252 of blade attachment member 244 and, more specifically, to coupling member 250 that provides a pivot point with the blade attachment member 244. In a particular embodiment, coupling member 250 can represent any device that is capable of allowing the extendable member 312 to rotate relative to blade attachment member 244 (e.g., a hinge member). In other embodiments, extendable member 312 can be coupled to a different portion of blade attachment member 244, such as to first end 248 of blade attachment member 244 or to another portion of second end 252 of blade attachment member 244. Extendable member 312 is further configured to be coupled to moveable arm 272, such as to second end 280 of moveable arm 272 and, more specifically, to coupling member 300 of base member 296. In other embodiments, extendable member 312 can be coupled to a different portion of moveable arm 272, such as to first end 276 of moveable arm 272 or to another portion of second end 280 of moveable arm 272. Extendable member 312 operates to couple blade attachment member 244 to moveable arm 272 to enable relative motion therebetween. The position at which extendable member 312 is coupled to each of blade attachment member 244 and moveable arm 272 can vary depending, for example, on a desired length of extendable member 312, on a desired amount of relative motion between blade attachment member 244 and moveable arm 272, and/or on a portion of blade attachment member 244 and moveable arm 272 that can best accommodate forces on extendable member 312 and/or blade attachment member 244 and moveable arm 272.

Figure 8:
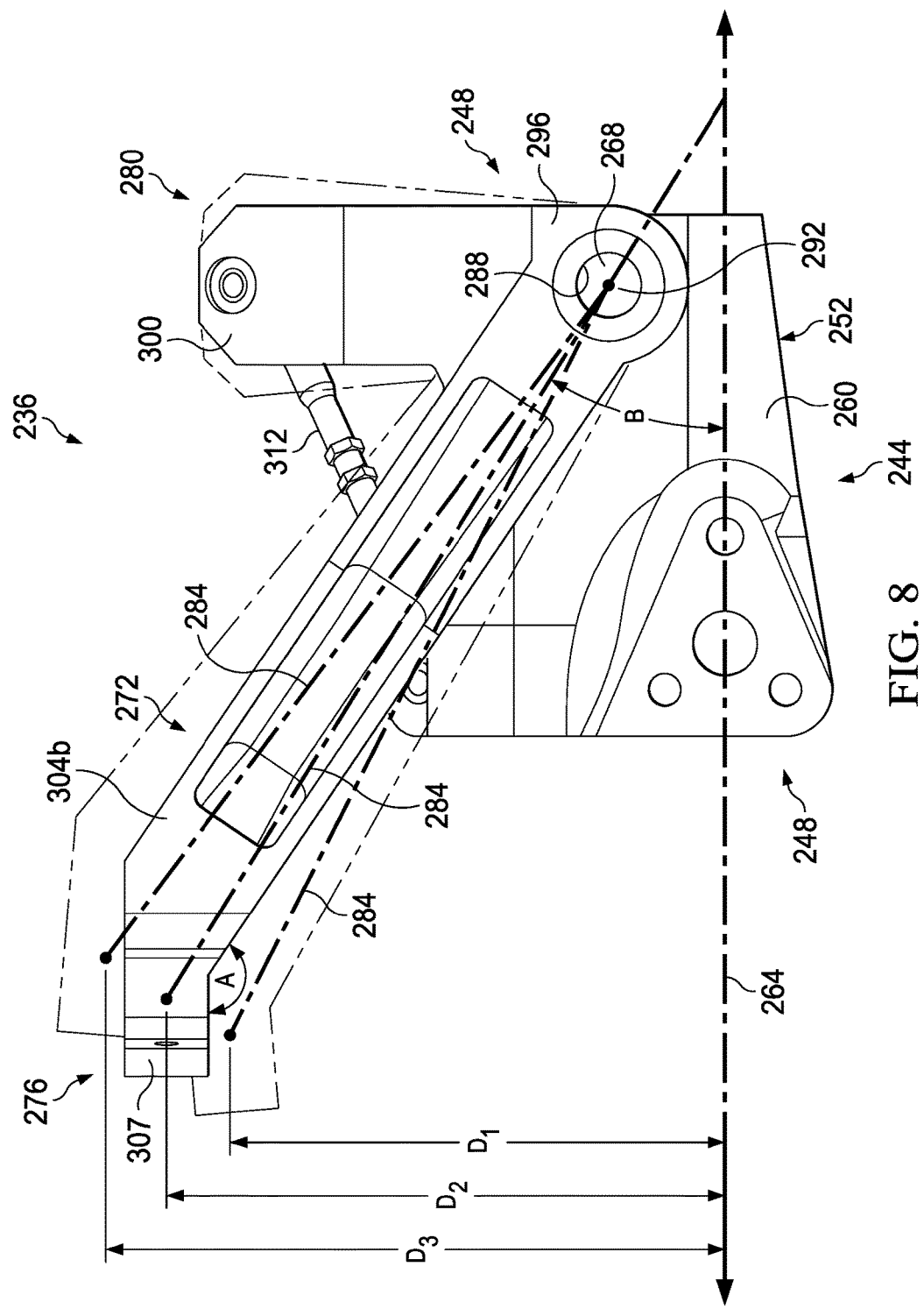
FIG. 8 is a bottom view of a pitch horn assembly, according to one example embodiment.

As above, extendable member 312 operates to enable relative motion between blade attachment member 244 and moveable arm 272. Extendable member 312 can actively or passively enable relative motion between blade attachment member 244 and moveable arm 272. For example, in some embodiments, extendable member 312 includes one or more components, such as an actuator, that can actively move moveable arm 272 relative to blade attachment member 244, such as by lengthening extendable member 312, shortening extendable member 312, and/or moving one or more components of extendable member 312. In other embodiments, extendable member 312 includes one or more components that can enable passive movement of extendable member 312 and, therefore, extendable member can indirectly enable movement of moveable arm 272 relative to blade attachment member 244, such as if extendable member 312 is itself moved by one or more components (e.g., one or more actuators). Therefore, for example, extendable member 312 can be activated actively by extendable member 312 and/or passively by one or more components coupled to extendable member 312. In the embodiment shown, if activated, extendable member 312 is configured to move (actively or passively) moveable arm 272 and/or moveable arm axis 284 about pitch horn axis 292. For example, in the embodiment shown, extendable member 312 can be activated to move (actively or passively) first end 276 of moveable arm 272, such as pitch link coupling member 307, and/or moveable arm axis 284 about pitch horn axis 292 to define an angle B of at least 1 degree (e.g., at least 1, 5, 10, 15, 20, 30, 40, 50, 60, 70, 80, 90, 100, 110, 120 degrees, or more). In some embodiments, angle B can be 0 degrees, while still enabling moveable arm 272 to be adjusted to increase angle B. As another example, in the embodiment shown, extendable member 312 can be activated to move (actively or passively) first end 276 of moveable arm 272, such as pitch link coupling member 307, and/or moveable arm axis 284 about pitch horn axis 292 such that first end 276 of moveable arm 272, such as pitch link coupling member 307, is positioned at least 1 inch away from (e.g., at least 1, 3, 5, 7, 9, 11, 13, 15, 17, 19 inches, or more) blade attachment axis 264 and/or blade axis 234 (e.g., such as when blade attachment axis 264 and blade axis 234 are coaxial). As still another example, the embodiment shown in FIGS. 7-8 depict three configurations of moveable arm 272 moved or rotated at different angles B about pitch horn axis 292 such that pitch link coupling member 307 is positioned three different distances $D_1$, $D_2$, and $D_3$ away from blade attachment axis 264 (and also from blade axis 234 in FIG. 7).

Pitch horn assembly 236 can be coupled to any rotor blade and/or rotor hub to improve pitch-flap coupling during flight and/or to improve adjustability of the rotor blade, the pitch horn, the pitch link, and other related components, depending on the circumstances. The adjustability of pitch horn assembly 236 permits adjustment of the pitch horn radius, which is the distance between axis 72 (e.g., centerline of mast 96 and a portion of the pitch horn coupled to a pitch link (e.g., first end 276 of moveable arm 272). For example, in the embodiment shown, extendable member 312 can be activated to move (actively or passively) moveable arm 272, which can adjust a portion of a pitch link to which moveable arm 272 is coupled to bring the pitch link closer to or farther from a rotor blade. During flight, such adjustability enables independent adjustment of the blade angle and/or blade position of each rotor blade. For example, if a rotor blade assembly is experiencing forces occur on an aircraft during rotation of one or more rotor assemblies, such as during flight, as explained in detail above, one or more pitch horn assemblies 236 (and, therefore, the pitch horn radius) can be adjusted to adjust the blade angle and/or blade position of one or more rotor blades to account for and oppose the forces. Because of the adjustability of pitch horn assembly 236, pitch horn assembly 236 can be coupled to any rotor blade assembly and adjusted, such as by extendable member 312 to move (actively or passively) moveable arm 272 relative to blade attachment member 244).

Figure 9:
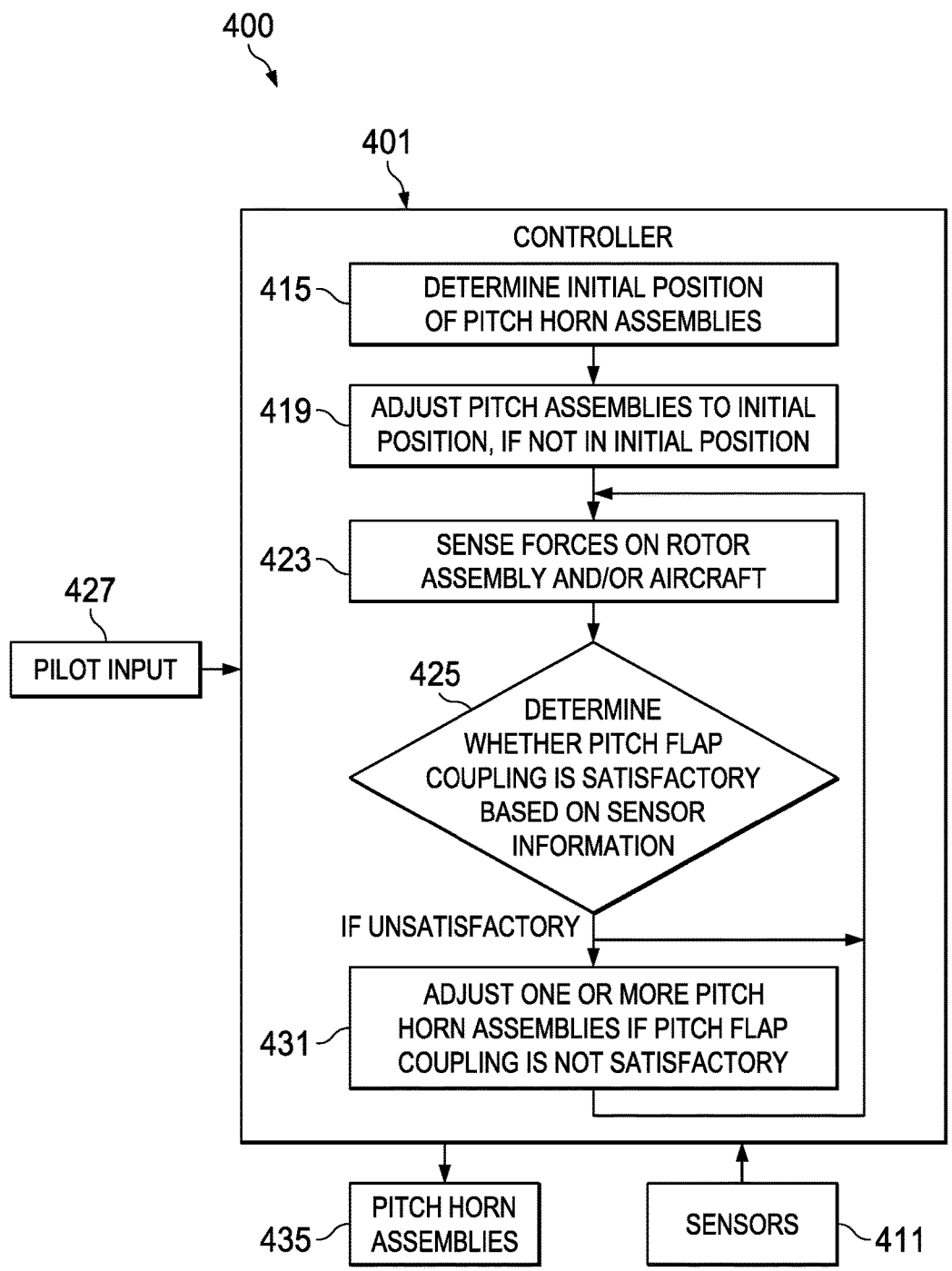
FIG. 9 is a schematic of a pitch horn assembly control system, according to one example embodiment.

The pitch horn assemblies of this disclosure and, therefore, the rotor assemblies to which the pitch horn assemblies are coupled, can be adjusted automatically by a flight controller or manually by a pilot. FIG. 9 depicts one example of a pitch horn assembly control system 400. Pitch horn assembly control system 400 can include controller 401, which is coupled to and in electrical communication with one or more pitch horn assemblies 435 and is further coupled and in electrical communication with one or more sensors 411. One or more pitch horn assemblies 435 can be coupled to a rotor assembly of an aircraft as detailed above. One or more sensors 411 can be coupled to the aircraft and be configured to detect forces on the aircraft, such as forces on the rotor assembly. For example, and not limitation, the indicators of rotor function such as whirl, flapping, wind bending, etc., can be measured with conventional gauges that are places on the aircraft, such as at the rotor hub (e.g., to determine flapping). Controller 401 can provide and/or determine an initial position of pitch horn assemblies based, for example, on preprogrammed information that indicates a preferred starting position under varying circumstances, as shown in block 415. As depicted in block 419, controller 401 can send an initial position command to pitch horn assemblies 435 to adjust pitch horn assemblies 435 to the initial positions, if the pitch horn assemblies 435 are not already in the initial positions. As shown in block 423, controller 401 can then detect forces on the aircraft, such as forces on the rotor assembly, including the rotor blades, with sensors 411 that occur based on the initial position of pitch horn assemblies 435. As depicted in block 425, controller 401 can next determine whether pitch-flap coupling is satisfactory based on information received from the one or more sensors 411. Whether pitch-flap coupling is satisfactory can be based, for example, on preprogrammed information that indicates a maximum force, minimum force, and/or a range of acceptable forces under given circumstances. As shown in block 431, controller 401 can adjust one or more pitch horn assemblies 435 to another position, if pitch-flap coupling was determined to be unsatisfactory, and controller 401 returns to detect forces on the aircraft, such as on the rotor assembly, through sensors 411. If pitch-flap coupling was determined to be satisfactory in step 425, controller 401 may not adjust pitch horn assemblies 435 and return to step 423 to detect forces on the aircraft, such as on the rotor assembly. Pilot input 427 can be coupled to controller 401 to override and/or compliment any of the commands of controller 401 to enable a pilot to manually adjust one or more pitch horn assemblies 435.

Figure 10A:
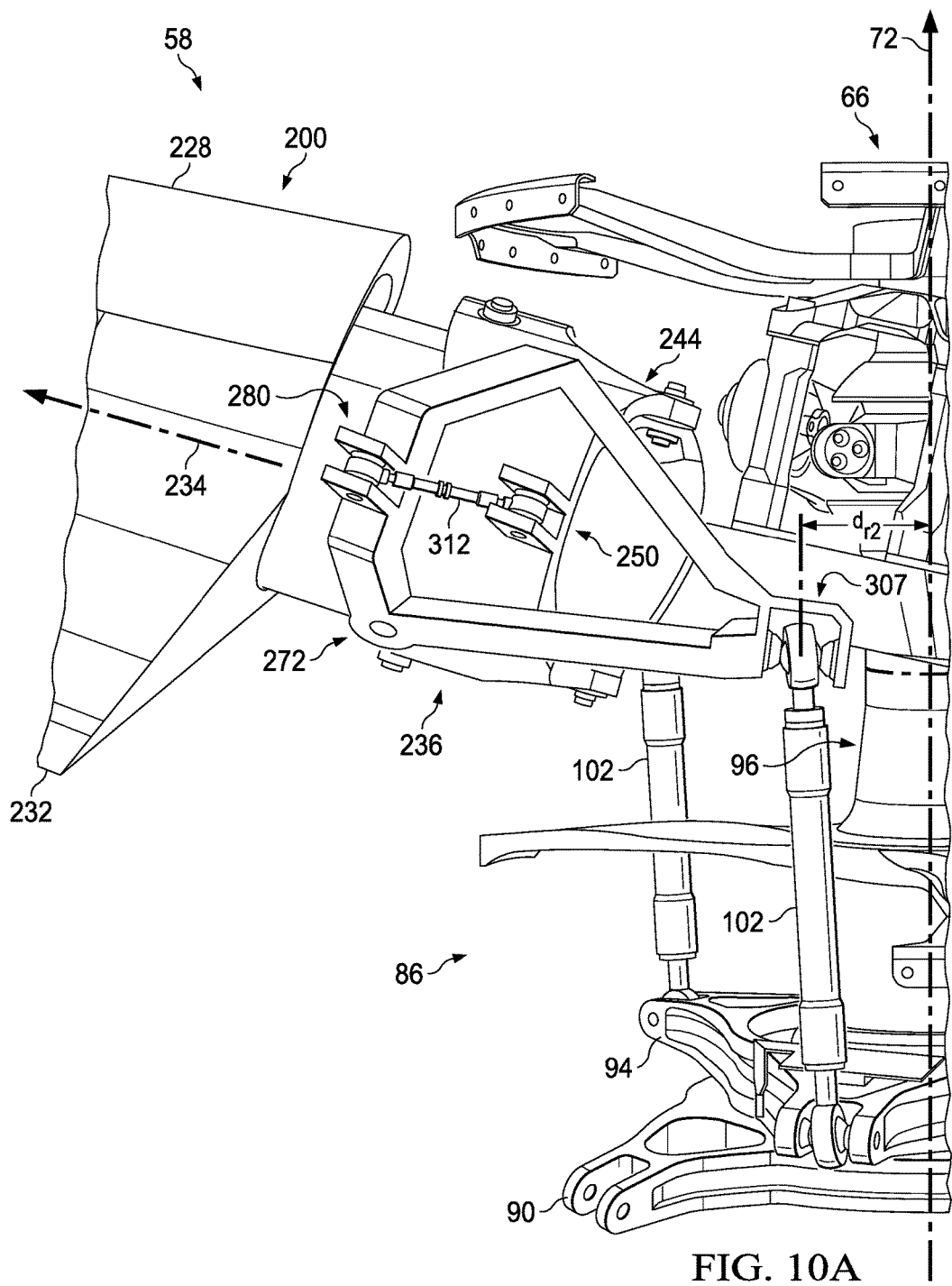
FIGS. 10A-10B are side views of a rotor assembly, according to one example embodiment.
Figure 10B:
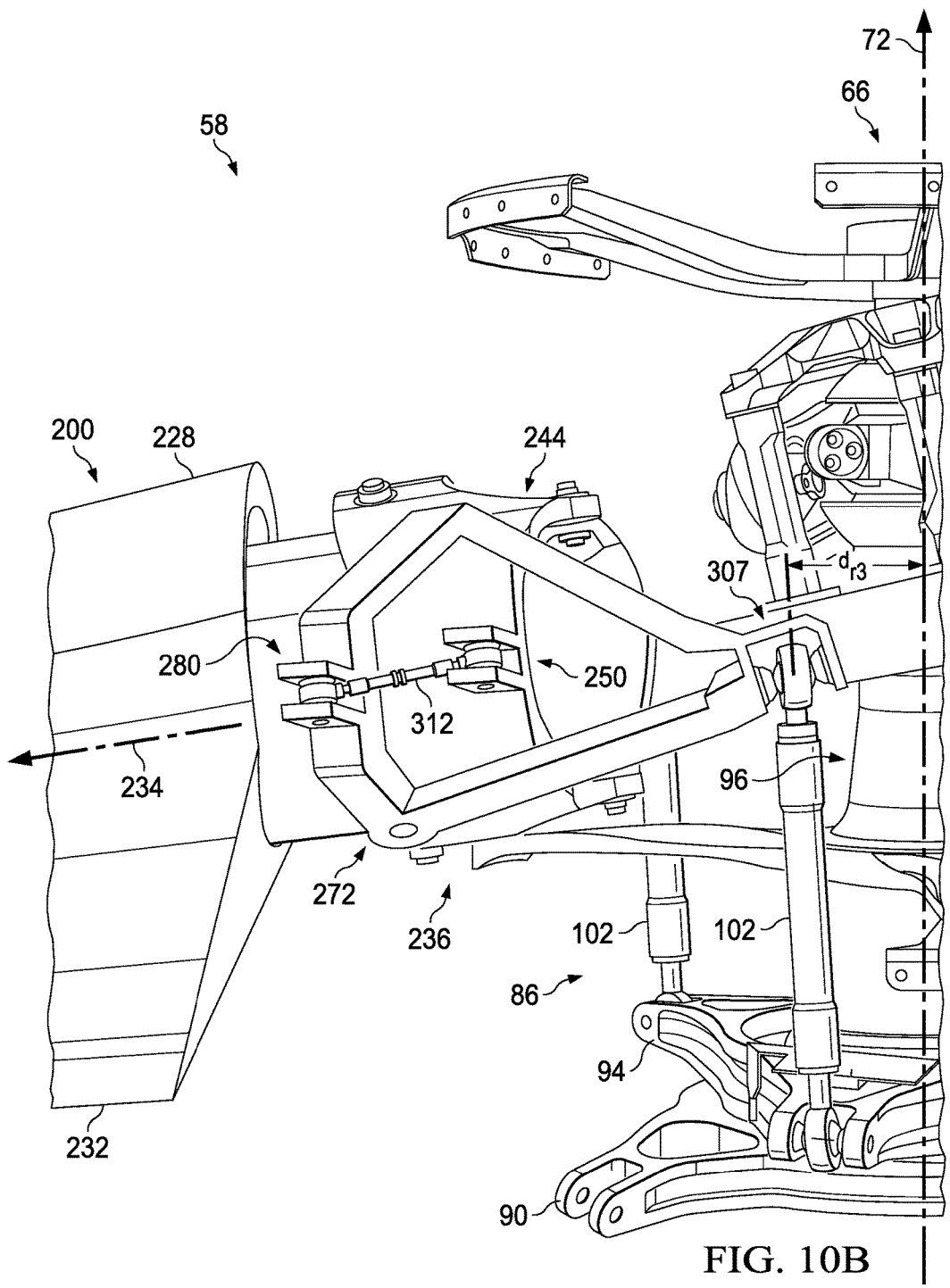

FIGS. 10A-10B depict an embodiment of the present pitch horn assembly coupled to a rotor assembly. The rotor hub shown in FIGS. 10A-10B can include the same or similar features and characteristics as those described with respect to in FIGS. 3A-4B and, therefore, the rotor hub components of FIGS. 10A-10B are enumerated accordingly. Similarly, the rotor blade and pitch horn assembly of FIGS. 10A-10B can include the same or similar features and characteristics as the those described with respect to FIGS. 5-8 and, therefore, the components of FIGS. 10A-10B are enumerated accordingly.

In the embodiment shown in FIGS. 10A-10B, pitch horn assembly 236 is coupled to rotor blade 200 on the trailing edge side of rotor blade 200. Such a configuration can be used, for example, for a tiltrotor aircraft. For example, if moveable arm 272 is adjusted outward by the extendable member 312 (e.g., in a direction away from blade axis 234), trailing edge 232 of rotor blade 200 moves downward, and leading edge 228 moves upward, increasing pitch of rotor blade 200. Similarly, if moveable arm 272 is adjusted inward by extendable member 312 (e.g., in a direction toward blade axis 234), trailing edge 232 of rotor blade 200 moves upward, and leading edge 228 moves downward, decreasing pitch of rotor blade 200. As shown in FIG. 10A-10B, the pitch horn radius is adjustable during movement of rotor blade 200 via pitch horn 98 and pitch link 102; for example, and not limitation, when rotor blade 200 is flapped upward in FIG. 10A, when rotor blade 200 is flapped downward in FIG. 10B, and in other instances in which rotor blade 200 is moved via pitch horn assembly 236 and pitch link 102. For example, as depicted in FIG. 10A, pitch horn radius has dimension $d_{r2}$, and as depicted in FIG. 10B, pitch horn radius has dimension $d_{r3}$. Pitch horn assembly 236 enables adjustment of a pitch horn radius by, for example, moving moveable arm 272 inward or outward relative to the blade axis 234.

FIGS. 11A-11I depict an embodiment of pitch horn assembly 436 coupled to a rotor assembly. The rotor hub shown in FIGS. 11A-11I can include the same or similar features and characteristics as those described with respect to in FIGS. 3A-4B and, therefore, the rotor hub components of FIGS. 11A-11I are enumerated accordingly. Certain components of pitch horn assembly 436 are as described above in connection with pitch horn assembly 236. Those components bear similar reference characters to the components of the pitch horn assembly 236, but with a leading '4' rather than a leading '2' or '3'. In the embodiment shown in FIGS. 11A-11I, pitch horn assembly 436 is coupled to rotor blade 200 generally on the leading edge 228 portion (forward portion 228f of the blade) of rotor blade 200 and includes an extendable member 412. In the exemplary embodiment, pitch horn assembly 436 includes blade attachment member 444 disposed on the leading edge surface of grip 208. The pitch horn assembly 436 is disposed on the leading edge 228 of blade 200 such that, if pitch link 102 moves moveable arm 472, moveable arm 472 moves the leading edge 228 of blade 200. Such a configuration can be used, for example, for a helicopter aircraft. For example, if the extendable member 412 moves moveable arm 472 outward, moveable arm 472 moves leading edge 228 of rotor blade 200 downward, and trailing edge 232 moves upward decreasing pitch of rotor blade 200. Similarly, if extendable member 412 moves moveable arm 472 inward, moveable arm 472 moves leading edge 228 of rotor blade 200 upward, and trailing edge 232 moves downward, increasing pitch of rotor blade 200. However, in other embodiments, pitch horn assembly 436 can be coupled to rotor blade 200 in other locations suitable to adjust the orientation of blade 200 during operation, for example, but not limitation, generally on the trailing edge 232 or 228a (aft portion of the blade), and/or on a top or bottom surface 220, 224 of blade 200.

Pitch horn assembly 436 includes a moveable arm 472 coupled to the extendable member 412. Movable arm 472 includes base member 496 disposed between the first and second extension members 404a, 404b. Base member 496 is fixedly connected to an outboard end of the extendable member 412. In certain embodiments, extendable member 412 and movable arm 472 can be made in one piece; in other embodiments, extendable member 412 and movable arm 472 can be made in any number of multiple pieces. The inboard end of extendable member 412 is coupled to the blade attachment member 444 by a coupling member 450. In a particular embodiment, coupling member 450 can represent any device that is capable of allowing the extendable member 412 to rotate relative to blade attachment member 444 (e.g., a hinge member).

Extendable member 412 can include a plurality of holes 413 drilled therethrough in order to accommodate a fastener 450f. The plurality of holes 413 can be any number of holes (e.g., 2, 3, 4, 5, 6, 7, 8, 9, 10, 20) as needed to adjust the pitch horn radius. In an embodiment, extendable member 412 includes a first hole 413a, a second hole 413b, a third hole 413c, and a fourth hole 413d. Fastener 450f secures the extendable member 412 to the coupling member 450 and thereby to the blade attachment member 244. Fastener 450f can be a conventional fastener, for example, a screw or bolt with a nut or other securing member. The position of the fastener 450f provides a pivot point for the extendable member 412 that can be adjusted to any one of the plurality of holes 413 during manufacture or by a flight technician during service and maintenance. In the exemplary embodiment, fastener 450f is secured in third hole 413c. For a different aircraft, fastener 450f can be secured in the first hole 413a, second hole 413b, or third hole 413d. The use of the fastener 450f in a selected position (e.g., first, second, third, and fourth holes 413a, 413b, 413c, 413d) can adjust the pitch horn radius of the pitch horn assembly 436. In some embodiments, the pitch horn radius of the pitch horn assembly 436 can be adjusted using the fastener 450f in one of the plurality of holes 413 to vary, for example, a desired length of the extendable member 412, a desired amount of relative motion between blade attachment member 444 and movable arm 474, and/or a position of the pivot point of the extendable member 412 that can best accommodate forces on extendable member 412 and/or blade attachment member 444 and/or moveable arm 272. It will be appreciated that the contemplated embodiment of the extendable member 412 is configured with a plurality of holes 413 and a fastener 450f; however, it should be appreciated that extendable member 412 may take on a wide variety of configurations. For example, the plurality of holes 413 and fastener 450f associated with the extendable member 412 may be replaced with any combination of adjustable assemblies (e.g., slots with a fastener, an adjustable bushing, a telescoping member, etc.). Pitch horn assembly 436 can advantageously be adjustable to accommodate various types of aircraft. Pitch horn assembly 436 can be interchangeable with various types of aircraft in that pitch horn assembly 436 can be exchanged between various types of aircraft with no degradation in performance, reliability, or maintainability by adjusting the position of the fastener 450f in to a particular hole in the extendable member 412.

Figure 11A:
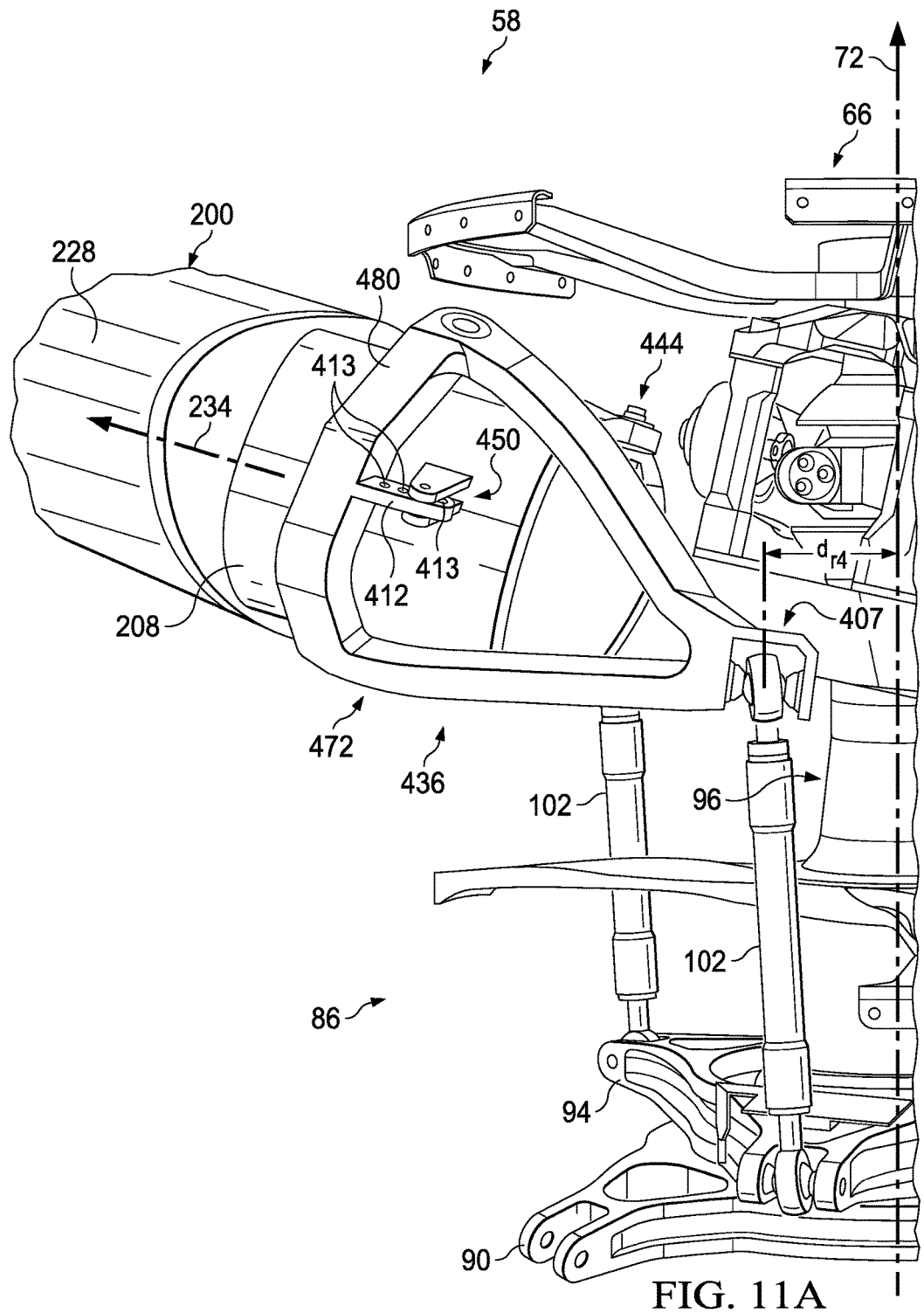
FIGS. 11A-11C are side views of a rotor assembly according to one example embodiment.
Figure 11B:
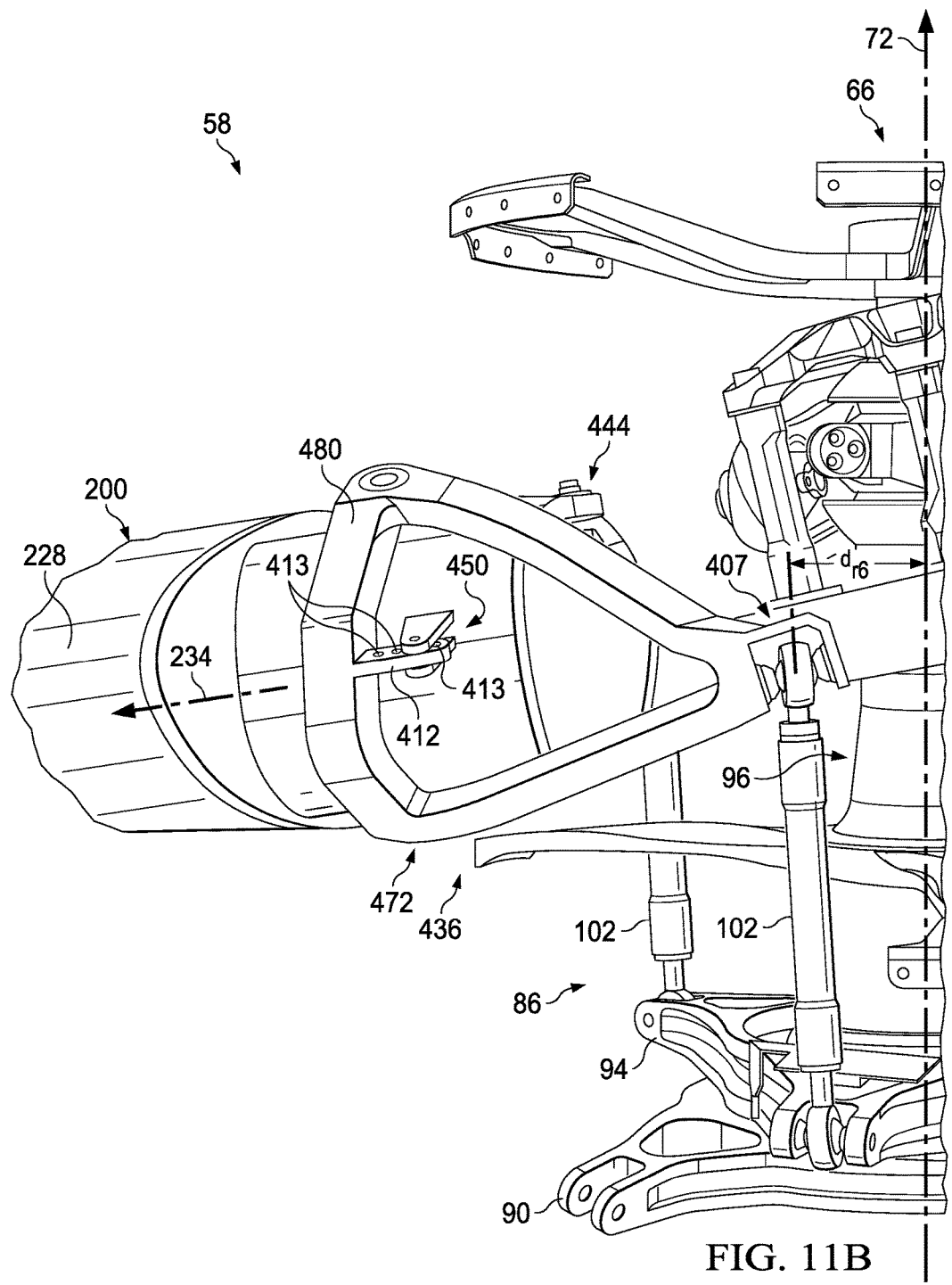
Figure 11C:
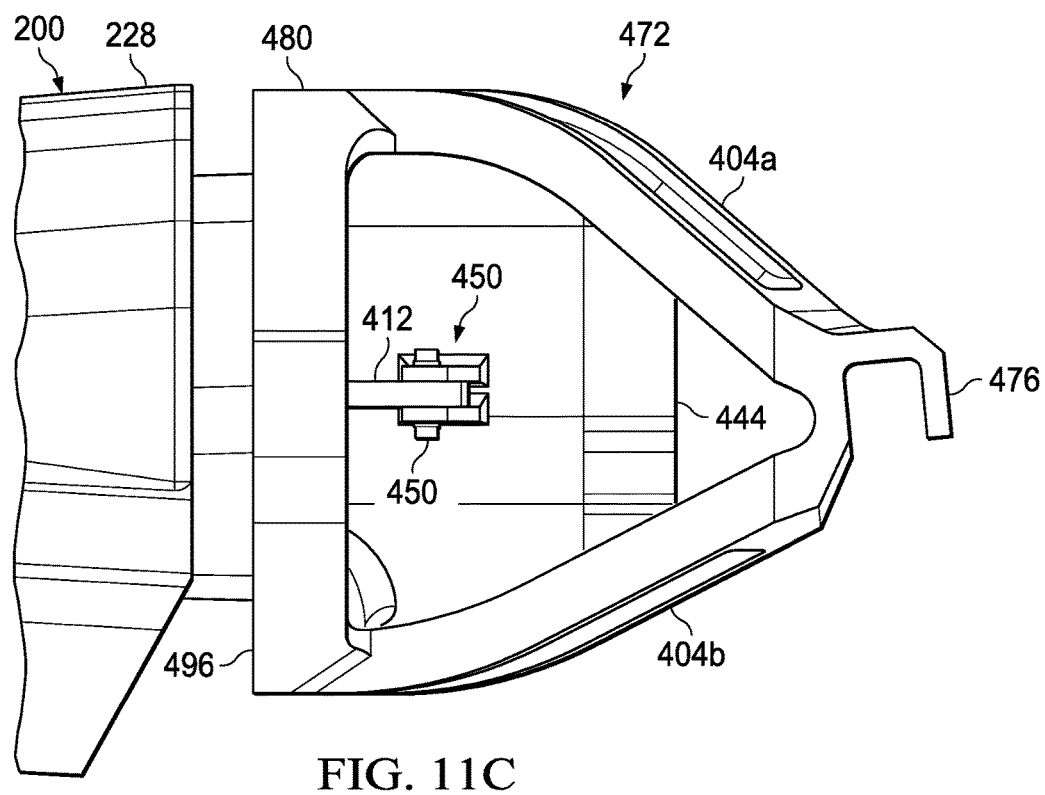
Figure 11D:
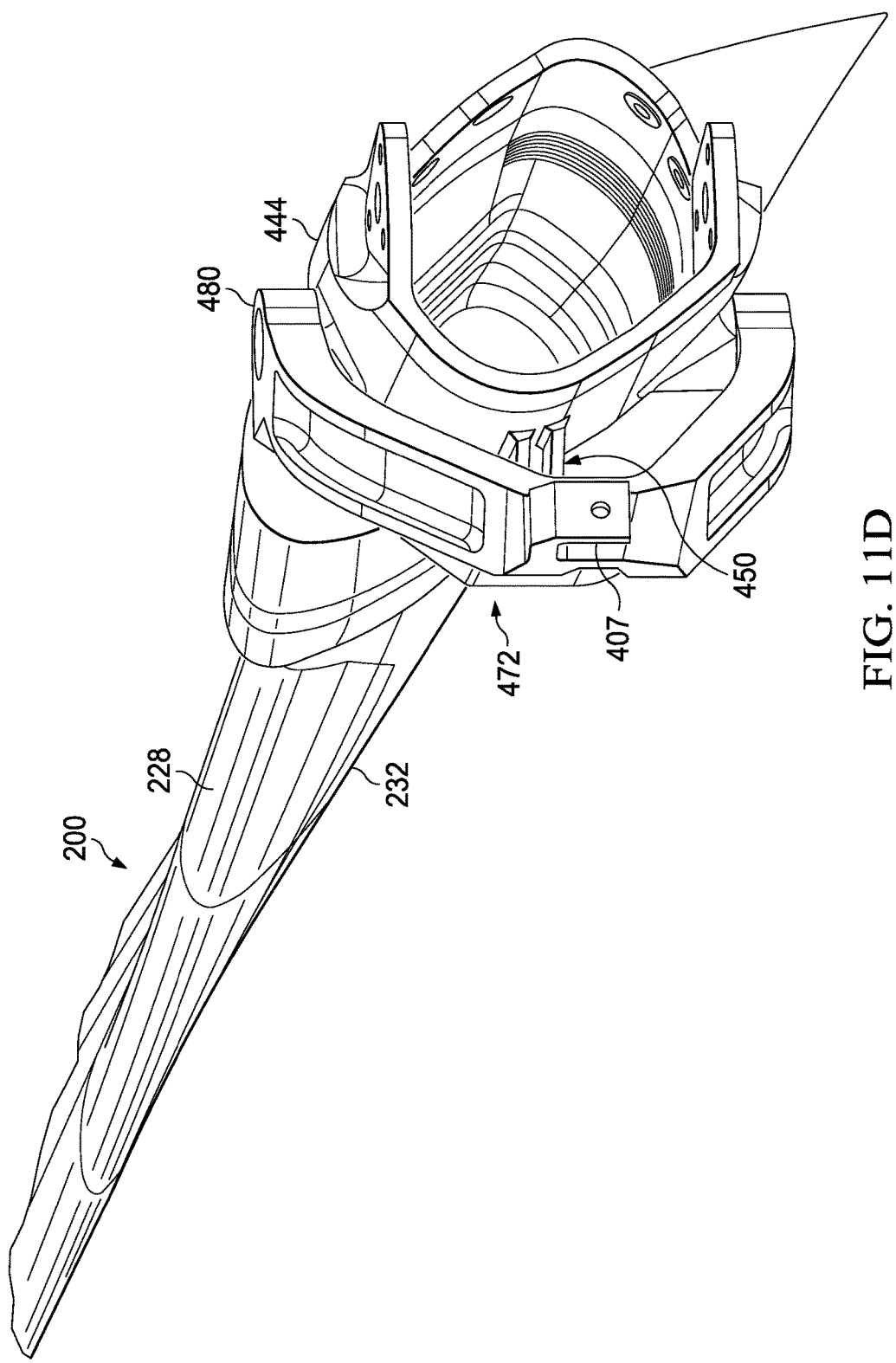
FIGS. 11D and 11F are side and front perspective views, respectively, of the rotor assembly in FIG. 11A, according to one example embodiment.
Figure 11E:
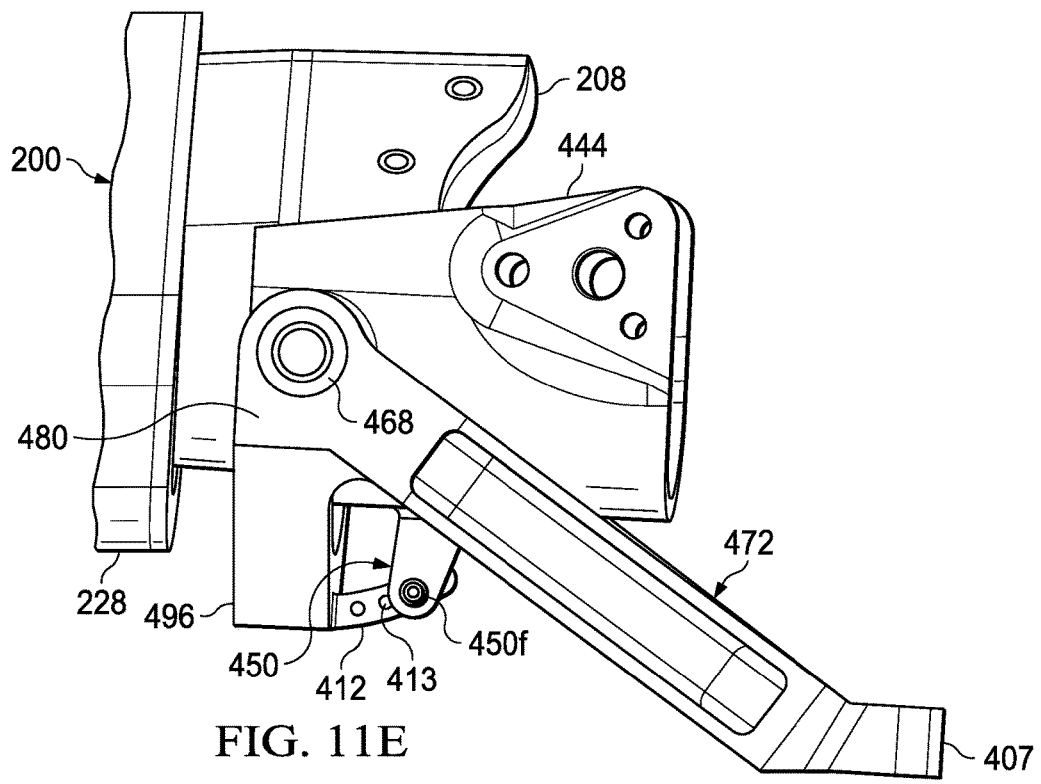
FIGS. 11E and 11G are top views of the rotor assembly in FIG. 11A, according to one example embodiment.
Figure 11F:
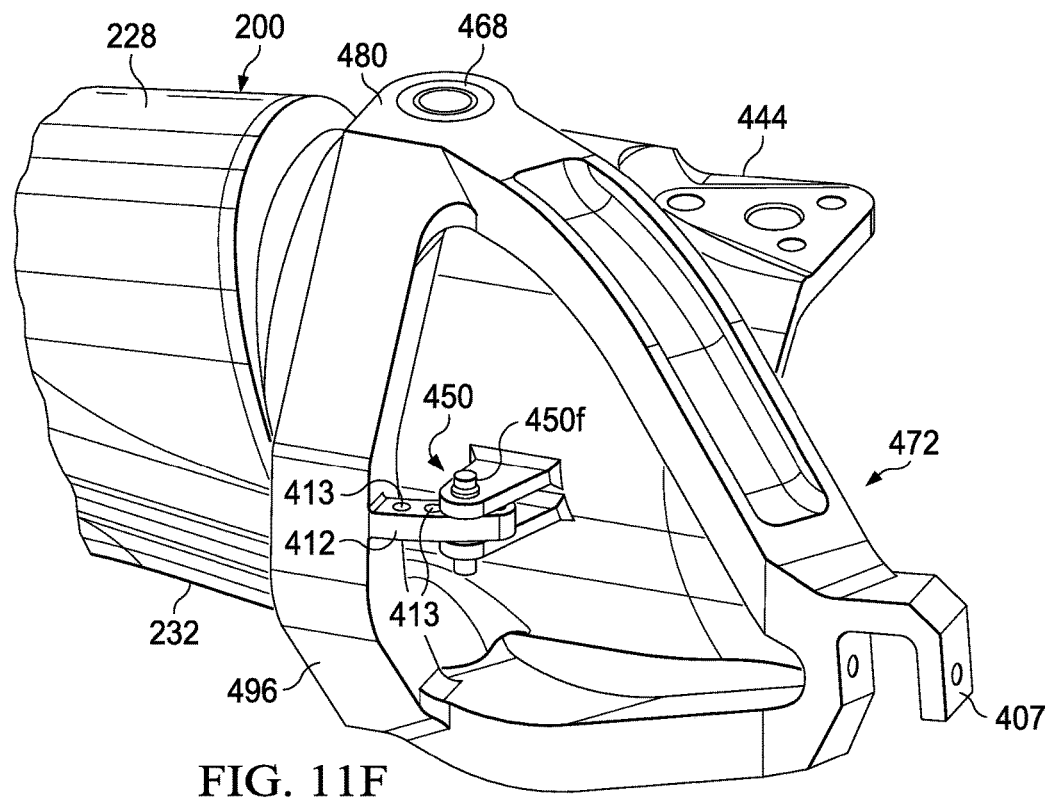

As shown in FIG. 11A-11B, a pitch horn radius is adjustable during movement of rotor blade 200 via pitch horn 98 and pitch link 102 when rotor blade 200 is flapped upward in FIG. 11A, when rotor blade 200 is flapped downward in FIG. 11B, and in other instances in which rotor blade 200 is moved via pitch horn assembly 436 and pitch link 102. For example, as depicted in FIG. 11A, pitch horn radius has dimension $d_{r4}$, and as depicted in FIG. 11B, pitch horn radius has dimension $d_{r6}$. Pitch horn assembly 436 enables adjustment of a pitch horn radius by, for example, moving the moveable arm 472 inward or outward relative to the blade axis 234.

Figure 11G:
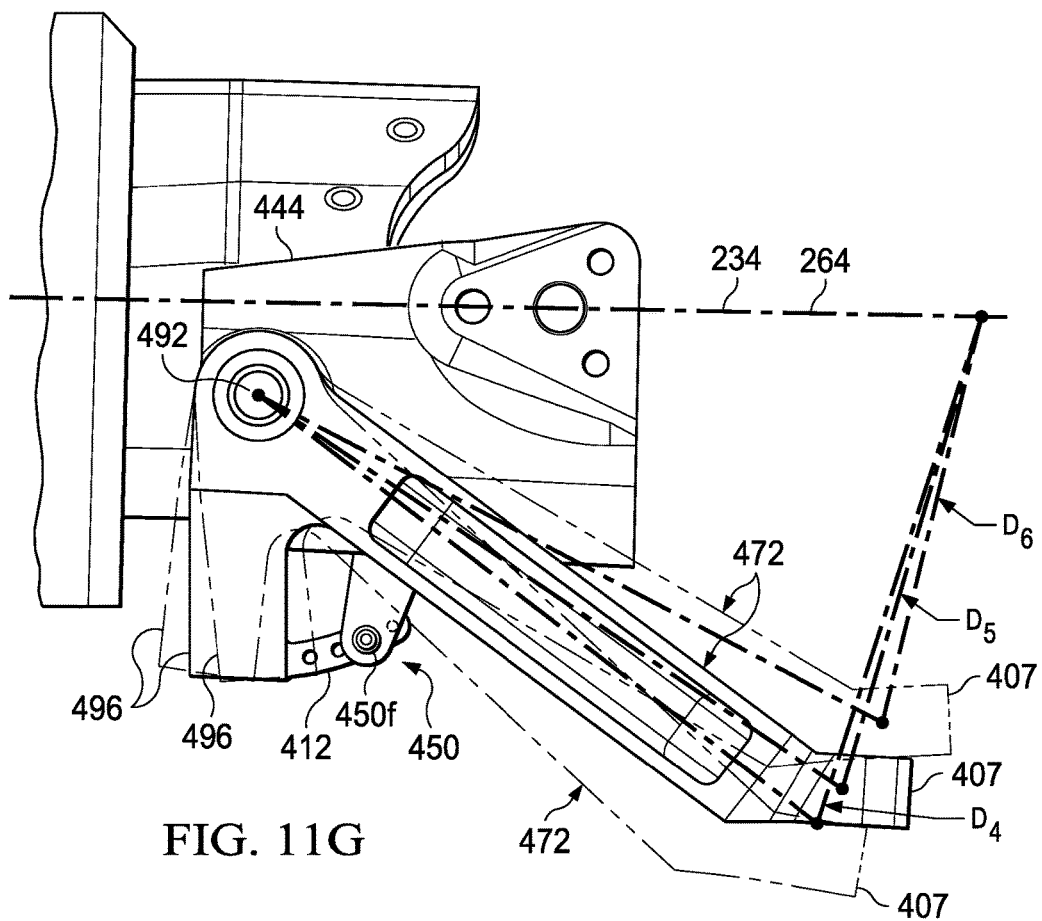
Figure 11H:
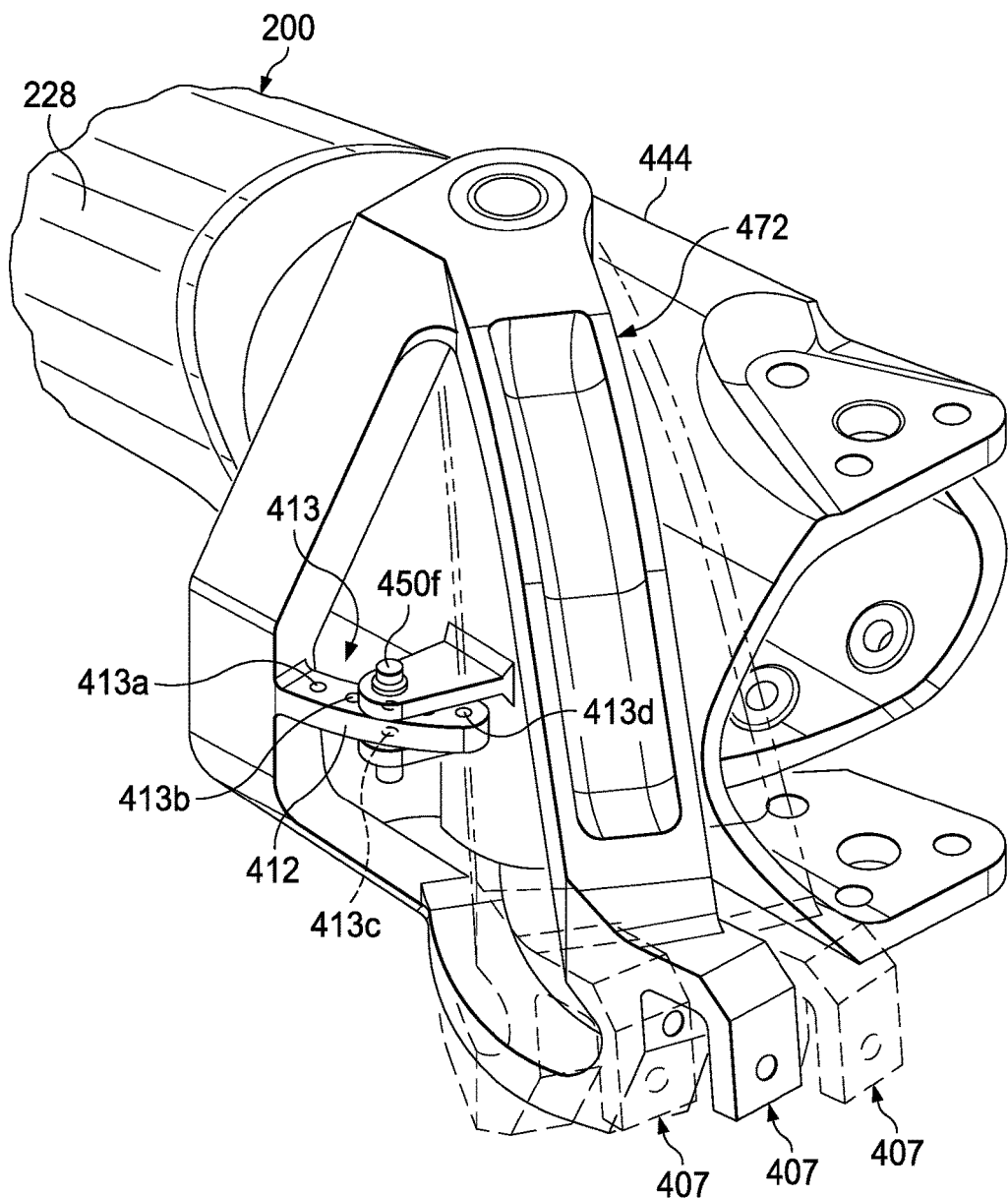
FIG. 11H is a front perspective view of the rotor assembly in FIG. 11A, according to one example embodiment.
Figure 11I:
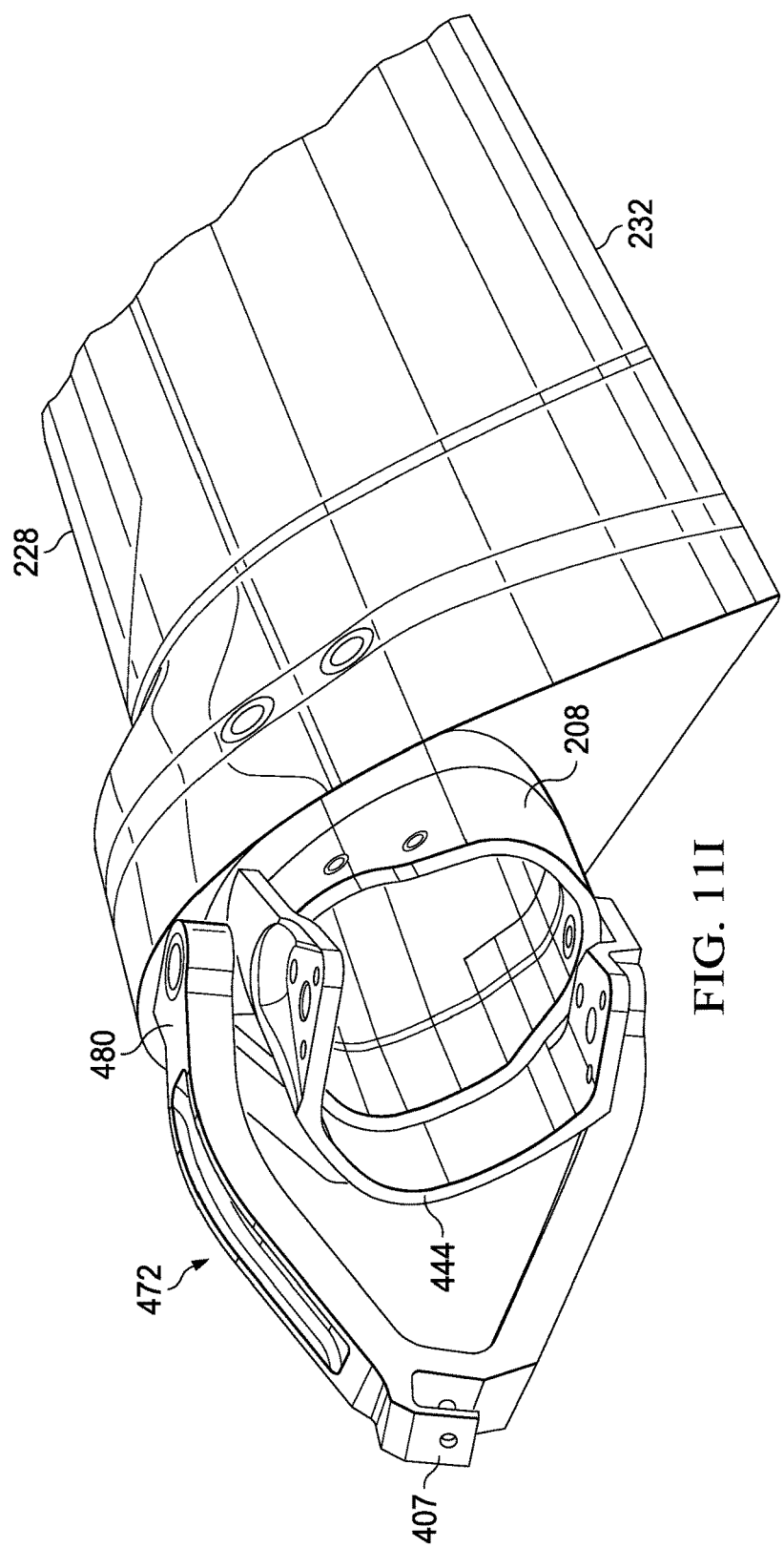
FIG. 11I is a rear perspective view of the rotor assembly in FIG. 11A, according to one example embodiment.

As another example, the pitch horn assembly 436 shown in FIG. 11G depicts three configurations of moveable arm 472 moved or rotated at different angles about pitch horn axis 492 such that pitch link coupling member 407 is positioned three different distances $D_4$, $D_5$, and $D_6$ away from blade attachment axis 264 (and also from blade axis 234).

FIGS. 12A-12B depict embodiments of pitch horn assembly 536 coupled to a rotor assembly. Certain components of pitch horn assembly 536 are as described above in connection with pitch horn assembly 236. Those components bear similar reference characters to the components of the pitch horn assembly 236, but with a leading '5' rather than a leading '2'. Pitch horn assembly 536 can be positioned adjacent to a top or bottom surface 220, 224 of the rotor blade 200, as shown in FIGS. 12A-12B. In some embodiments, movable arm 572 can move outward and inward toward blade axis 234, as shown in FIG. 12A. In an embodiment, moveable arm 572 can move upward and downward toward the blade axis 234, as shown in FIG. 12B.

In some embodiments, pitch horn assembly 536 can be at a position substantially equidistant between the leading edge 228 and the trailing edge 232 of rotor blade 200. In other embodiments, pitch horn assembly 536 can be disposed in a forward portion 228*f* of the blade 200. The forward portion 228*f* of the blade 200 can be a portion between the leading edge 228 and blade axis 234. In an embodiment, shown in FIG. 12A, pitch horn assembly can be disposed in an aft portion 228*a* of the blade 200. The aft portion 228*a* can be a portion between the blade axis 234 and the trailing edge 232.

Furthermore, the present pitch horn assemblies described herein can assist in enabling a foldable rotor blade to fold in a direction toward the pitch horn assemblies (e.g., inboard of the pitch horn assemblies); and, in other embodiments, a foldable rotor blade can fold in a direction away from the pitch horn assemblies (e.g., outboard of the pitch horn assemblies). Movable arm 272 of the present pitch horn assemblies can assist in positioning the pitch link to which it is coupled in an orientation to best accommodate a folded rotor blade.

As explained above, each of the pitch horn assemblies (e.g., pitch horn assembly 236, pitch horn assembly 436, pitch horn assembly 536) of this disclosure can be used on a variety of aircrafts. The pitch horn assemblies can be interchangeable with various types of aircraft in that pitch horn assembly can be exchanged between various types of aircraft with no degradation in performance, reliability, or maintainability. The use of interchangeable parts is of particular importance to manufacturing and maintenance in the aircraft industry. Designing, manufacturing, stocking, shipping and maintaining a supply of conventional pitch horns having various sizes and shape for different types of aircraft can be burdensome for the aircraft manufacturer and customers. It is imperative that a damaged pitch horn be replaced quickly so that aircraft downtime is minimized. Oftentimes the replacement pitch horn must be ordered and shipped into the field. It is important that the pitch horn assemblies as described herein are interchangeable and fit a variety of aircraft to improve the speed of manufacture and reduce the time for replacement (as compared to conventional pitch horns).

A pitch horn assembly of this disclosure can include adjustable portions (e.g., extendable member 312, extendable member 412 and associated coupling members and/or movable arm 272, movable arm 472, movable arm 572) the as described that enable such a pitch horn assembly to be coupled to different sizes of the same type aircraft or to different types of aircrafts. For example, a pitch horn assembly of this disclosure can be coupled to a smaller aircraft of a first type (e.g., a tiltrotor). The same pitch horn assembly can be adjusted as described in detail throughout this disclosure and coupled to a larger aircraft of the first type and further adjusted as necessary for such larger aircraft. Similarly, the same pitch horn assembly can be adjusted as described in detail throughout this disclosure and coupled to an aircraft of a second type (e.g., a helicopter) of the same or different size and further adjusted as necessary for such a second type. This disclosure also includes methods of improving pitch-flap coupling in an aircraft, including coupling a pitch horn assembly (e.g., pitch horn assembly 236) to at least one rotor blade of a plurality of rotor blades (e.g., rotor blade 200), where the pitch horn assembly includes a pitch horn (e.g., pitch horn 236, 436, 536) including a blade attachment (e.g., blade attachment member 244) and a moveable arm (e.g., moveable arm 272), where at least a portion of the moveable arm is configured to move or rotate about a pitch horn axis (e.g., pitch horn axis 292), and the pitch horn assembly further includes an extendable member (e.g., extendable member 312) coupled to the blade attachment and the moveable arm of the pitch horn. The present methods further include coupling the pitch horn assembly to a pitch link (e.g., pitch link 102), activating the extendable member, and permitting the extendable member to move the at least a portion of the moveable arm about the pitch horn axis such that the pitch link is adjusted. In some embodiments, the methods further include activating the extendable member to move the at least a portion of the moveable arm at least 15 degrees about the pitch horn axis. In some embodiments, the methods include detecting forces on the at least one rotor blade in a first position (e.g., with one or more sensors 411), activating the extendable member (e.g., with controller 401), permitting the extendable member to move the at least a portion of the moveable arm about the pitch horn axis to a second position in response to the forces, and detecting the forces on the at least one rotor blade in the second position (e.g., with one or more sensors 411). In some embodiments, wherein the at least one rotor blade includes a first end, a second end, and a blade axis extending between the first end and the second end, and wherein permitting the extendable member to move the at least a portion of the moveable arm about the pitch horn axis such that the pitch link is adjusted, the methods further include permitting the extendable member to move the at least a portion of the moveable arm about the pitch horn axis such that the moveable arm defines an angle from 0 to 120 degrees with respect to the blade axis. In some embodiments, the methods include uncoupling the pitch horn assembly from the at least one rotor blade, uncoupling the pitch horn assembly from the pitch link, coupling the pitch horn assembly to at least one rotor blade of a plurality of rotor blades of a different aircraft, coupling the pitch horn assembly to a pitch link of the different aircraft, activating the extendable member, and permitting the extendable member to move the at least a portion of the moveable arm about the pitch horn axis such that the pitch link is adjusted.

The pitch horn assemblies that are detailed above provide numerous advantages to aircrafts and to rotor assemblies, including to rotor assemblies used on an aircraft during flight. The pitch horn assemblies that are depicted and disclosed can enable improved pitch-flap coupling in order to accommodate various destabilizing forces that can occur on an aircraft during rotation of one or more rotor assemblies. Improved pitch-flap coupling with the disclosed pitch horn assemblies increases stability of an aircraft, increases adjustability of a rotor assembly, and improves versatility in addressing forces on an aircraft and on a rotor assembly during rotation. Such pitch horn assemblies can also lead to a reduction in swashplate actuator stroke, a reduction in swashplate actuator sizing (e.g., because such reduction in size can be accommodated by the adjustability of disclosed pitch horn assemblies), and, therefore, a reduction in overall aircraft weight, by reducing actuator travel requirements and affording assistance in the adjustment of a rotor blade. Furthermore, improved pitch-flap coupling can reduce the weight of rotor blades in the rotor assembly by eliminating the need to accommodate forces on an aircraft with added rotor blade material to increase rotor blade stiffness. Moreover, providing adjustability of a pitch horn assembly enables the pitch horn assemblies to be used on a number of different rotor assemblies and a number of different aircrafts because the pitch horn assemblies can be adjusted to account for variability in the size or orientation of the aircraft and/or the size or orientation of the aircraft components. The disclosed pitch horn assemblies additionally increase pilot control and/or automatic control of the aircraft, which ultimately improves safety.

The terms "a" and "an" are defined as one or more unless this disclosure explicitly requires otherwise.

The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Terms such as "first" and "second" are used only to differentiate features and not to limit the different features to a particular order or to a particular quantity.

Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_{l+} k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Any numerical range defined by two R numbers as defined in the above is also specifically disclosed and includes the two R numbers.

Use of the term "optionally" with respect to any element of a claim means that the element is required, or alternatively, the element is not required, both alternatives being within the scope of the claim.

Use of broader terms such as comprises, includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

The same or similar features of one or more embodiments are sometimes referred to with the same reference numerals within a figure or among figures. However, one or more features having the same reference numeral should not be construed to indicate that any feature is limited to the characteristics of another feature having the same reference numeral, or that any feature cannot already have, or cannot be modified to have, features that are different from another feature having the same reference numeral.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. An aircraft pitch horn assembly comprising:
   a blade attachment member having a first end, a second end configured to be coupled to a rotor blade; and a blade attachment axis extending between the first end and the second end of the blade attachment member;
   a moveable arm configured to be coupled to the blade attachment member at a pitch horn axis, the moveable arm comprising a first end configured to be coupled to a pitch link; a second end; and a moveable arm axis extending between the first end and the second end of the moveable arm; and
   an extendable member configured to be coupled to the blade attachment member and the moveable arm of the pitch horn;
   wherein the extendable member moves the moveable arm about the pitch horn axis.

2. The assembly of claim 1, wherein the extendable member is coupled to the first end of the blade attachment member, and the extendable member is coupled to the second end of the moveable arm.

3. The assembly of claim 1, wherein the second end of the moveable arm is configured to be coupled to the second end of the blade attachment member.

4. The assembly of claim 1, wherein the rotor blade comprises a first end, a second end, and a blade axis extending between the first end and the second end of the rotor blade, the blade attachment axis is substantially parallel to the blade axis, and the pitch horn axis is substantially perpendicular to the blade axis.

5. The assembly of claim 4, wherein the extendable member moves the first end of the moveable arm about the pitch horn axis such that the moveable arm axis defines an angle of at least 15 degrees with respect to the blade axis.

6. The assembly of claim 4, wherein the extendable member moves the first end of the moveable arm about the pitch horn axis such that the moveable arm axis defines an angle from 0 to 120 degrees with respect to the blade axis.

7. The assembly of claim 4, wherein the extendable member moves the first end of the moveable arm about the pitch horn axis such that the first end of the moveable arm is positioned at least 15 inches from the blade axis.

8. An aircraft rotor assembly comprising:
   a hub;
   a plurality of rotor blades extending from and configured to rotate about the hub, each of the plurality of rotor blades comprising a first end, a second end, and a blade axis extending between the first end and the second end;
   a pitch horn assembly coupled to at least one rotor blade of the plurality of rotor blades, comprising:
     a blade attachment member having a first end; and a second end coupled to the at least one rotor blade; a blade attachment member axis extending between the first end and the second end of the blade attachment member;
     a moveable arm coupled to the rotor assembly at a pitch horn axis, the moveable arm comprising a first end coupled to a pitch link; a second end; and a moveable arm axis extending between the first end and the second end of the moveable arm; and an extendable member coupled to the blade attachment member and the moveable arm of the pitch horn;

wherein the extendable member moves the moveable arm about the pitch horn axis.

9. The assembly of claim 8, wherein the pitch horn assembly permits adjustment of a pitch horn radius.

10. The assembly of claim 8, wherein the blade attachment member is fixedly coupled to the at least one rotor blade.

11. The assembly of claim 8, wherein the second end of the moveable arm is coupled to the second end of the blade attachment member.

12. The assembly of claim 8, wherein the extendable member is operable to change the rotor blade and pitch horn assembly configuration.

13. The assembly of claim 8, wherein the pitch horn assembly is operable to move a portion of the pitch link closer to the at least one rotor blade.

14. The assembly of claim 8, wherein the pitch horn assembly can be configured to adjust a leading edge of the at least one rotor blade or a trailing edge of the at least one rotor blade.

15. The assembly of claim 8, wherein the blade attachment member axis is substantially parallel to the blade axis, and the pitch horn axis is substantially perpendicular to the blade axis.

16. The assembly of claim 8, wherein the extendable member moves the first end of the moveable arm about the pitch horn axis such that the moveable arm axis defines an angle of at least 15 degrees with respect to the blade axis.

17. The assembly of claim 8, wherein the pitch horn assembly is disposed on at least one of the following: a leading edge, a trailing edge, a top surface, and a bottom surface of the at least one rotor blade.

18. A method of adjusting a pitch-flap coupling in an aircraft comprising:

providing a pitch horn assembly coupled to at least one rotor blade of a plurality of rotor blades, each having a blade axis, the pitch horn assembly comprising:

a blade attachment member;

a moveable arm, where at least a portion of the moveable arm is configured to move about a pitch horn axis and movably coupled to a pitch link; and an extendable member coupled to the blade attachment member and the moveable arm of the pitch horn; and moving the moveable arm about the pitch horn axis such that the pitch link is adjusted.

19. The method of claim 18, wherein the at least a portion of the moveable arm moves at least 15 degrees about the pitch horn axis.

20. The method of claim 18, further comprising:

detecting forces on the at least one rotor blade in a first position;

moving at least a portion of the moveable arm about the pitch horn axis to a second position in response to the forces; and detecting the forces on the at least one rotor blade in the second position.

21. The method of claim 18, wherein the step of moving further comprises:

moving the at least a portion of the moveable arm about the pitch horn axis such that the moveable arm defines an angle from 0 to 120 degrees with respect to the blade axis.

* * * * *